United States Patent
Zhu et al.

(10) Patent No.: US 12,261,516 B2
(45) Date of Patent: *Mar. 25, 2025

(54) MULTIBRIDGE POWER CONVERTER WITH MULTIPLE OUTPUTS

(71) Applicants: Huibin Zhu, Slingerlands, NY (US); Karen Ming Zhu, Slingerlands, NY (US)

(72) Inventors: Huibin Zhu, Slingerlands, NY (US); Karen Ming Zhu, Slingerlands, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/367,893

(22) Filed: Sep. 13, 2023

(65) Prior Publication Data
US 2023/0421042 A1    Dec. 28, 2023

Related U.S. Application Data

(63) Continuation of application No. 17/272,233, filed as application No. PCT/US2020/055933 on Oct. 16, 2020, now Pat. No. 11,817,769.

(30) Foreign Application Priority Data

Oct. 16, 2019    (WO) .................. PCT/IB2019/001318

(51) Int. Cl.
*B60L 53/22*    (2019.01)
*H02J 7/06*     (2006.01)
(Continued)

(52) U.S. Cl.
CPC ............ *H02M 1/009* (2021.05); *B60L 53/22* (2019.02); *H02J 7/06* (2013.01); *H02M 1/4208* (2013.01);
(Continued)

(58) Field of Classification Search
CPC ...... H02M 1/009; H02M 1/4208; H02M 1/44; H02M 3/33561; H02M 3/33584;
(Continued)

(56) References Cited

U.S. PATENT DOCUMENTS

| 7,092,267 B2 | 8/2006 | Carlson et al. |
| 7,362,597 B2 | 4/2008 | Ishikawa et al. |

(Continued)

FOREIGN PATENT DOCUMENTS

| CN | 105359401 A | 2/2016 |
| CN | 106605357 A | 4/2017 |

(Continued)

OTHER PUBLICATIONS

International Search Report an Written Opinion for PCT/US2020/055933, entitled: Multibridge Power Converter With Multiple Outputs, date of completion of report Mar. 10, 2021.

(Continued)

*Primary Examiner* — Elim Ortiz
*Assistant Examiner* — Xuan Ly
(74) *Attorney, Agent, or Firm* — Hamilton, Brook, Smith & Reynolds, P.C.

(57) ABSTRACT

According to one aspect of the present disclosure, there is provided a power converter apparatus that includes at least two switching bridges connected to a Direct Current (DC) bus and both generating pulse-width-modulated (PWM) voltages to non-isolated outputs, and an isolation transformer having a primary winding connected across the outputs of the two switching bridges and a secondary winding connected to isolated outputs. In a non-isolated mode, the two switching bridges are configured to operate in a parallel mode, and power is transferred between the DC bus and the non-isolated outputs. In an isolated mode, the two switching bridges are configured to operate in a full (Continued)

bridge mode, and power is transferred between the DC bus and the isolated outputs through the transformer.

20 Claims, 37 Drawing Sheets

(51) Int. Cl.
| | | |
|---|---|---|
| *H02M 1/00* | (2007.01) | |
| *H02M 1/42* | (2007.01) | |
| *H02M 1/44* | (2007.01) | |
| *H02M 3/335* | (2006.01) | |
| *H02M 7/797* | (2006.01) | |
| *H02P 27/08* | (2006.01) | |

(52) U.S. Cl.
CPC ......... *H02M 1/44* (2013.01); *H02M 3/33561* (2013.01); *H02M 3/33584* (2013.01); *H02M 7/797* (2013.01); *H02P 27/08* (2013.01); *B60L 2210/40* (2013.01); *H02J 2207/20* (2020.01)

(58) Field of Classification Search
CPC ...... H02M 7/797; H02M 1/4233; H02M 1/00; H02M 1/42; H02M 3/335; B60L 53/22; B60L 2210/40; B60L 15/08; B60L 2210/10; B60L 2240/526; B60L 15/007; B60L 53/24; H02J 7/06; H02J 2207/20; H02J 7/02; H02J 7/007; H02P 27/08; Y02T 10/70; Y02T 10/64; Y02T 10/7072; Y02T 10/92; Y02T 90/14
USPC ...................................................... 307/10.1
See application file for complete search history.

(56) References Cited

U.S. PATENT DOCUMENTS

| | | | |
|---|---|---|---|
| 8,013,553 B2 | 9/2011 | Taniguchi | |
| 8,198,855 B2 | 6/2012 | Fukui et al. | |
| 8,258,744 B2 | 9/2012 | Ishii et al. | |
| 9,227,518 B2 | 1/2016 | Fukushige | |
| 9,350,179 B2 | 5/2016 | Ando et al. | |
| 9,391,472 B2 | 7/2016 | Iyasu et al. | |
| 9,793,836 B2 | 10/2017 | Bouchez et al. | |
| 10,224,827 B1 | 3/2019 | Zhu et al. | |
| 10,696,182 B2 | 6/2020 | Khaligh et al. | |
| 11,817,769 B2 * | 11/2023 | Zhu .................. | H02M 3/33561 |
| 2003/0178889 A1 | 9/2003 | Algrain et al. | |
| 2009/0067205 A1 | 3/2009 | Oyobe et al. | |
| 2013/0077367 A1 | 3/2013 | Zhu et al. | |
| 2014/0292243 A1 | 10/2014 | Bouchez et al. | |
| 2015/0295504 A1 | 10/2015 | Tanahashi et al. | |
| 2016/0016479 A1 | 1/2016 | Khaligh et al. | |
| 2019/0252988 A1 | 8/2019 | Zhu et al. | |
| 2020/0412238 A1 | 12/2020 | Zhu et al. | |
| 2021/0016672 A1 | 1/2021 | Zhu et al. | |
| 2021/0155100 A1 * | 5/2021 | Khaligh .................. | B60L 55/00 |
| 2021/0408889 A1 | 12/2021 | Zhu et al. | |

FOREIGN PATENT DOCUMENTS

| | | | |
|---|---|---|---|
| CN | 108923678 A | | 11/2018 |
| CN | 110098756 A | | 8/2019 |
| DE | 102017206809 A1 | | 1/2018 |
| IN | 201831003729 | | 8/2019 |
| JP | 2007-318970 A | | 12/2007 |
| JP | WO2016038967 | * | 3/2016 |
| JP | 2016-086581 A | | 5/2016 |
| JP | 2018-078763 A | | 5/2018 |
| WO | 2014/188252 A2 | | 11/2014 |
| WO | 2016/038967 A1 | | 3/2016 |
| WO | 2016/103819 A1 | | 6/2016 |
| WO | 2020/106324 A1 | | 5/2020 |
| WO | 2020/106410 A2 | | 5/2020 |
| WO | 2020/149944 A1 | | 7/2020 |
| WO | 2020/242444 A1 | | 12/2020 |

OTHER PUBLICATIONS

PCT International Search Report and Written Opinion for International Application No. PCT/IB2019/001318, "Multibridge Power Converter with Multiple Outputs", Date of Mailing: Oct. 14, 2020.
Communication pursuant to Article 94(3) EPC for EP Application No. 20828746.6, dated Dec. 14, 2023.
Li, W., et al., "PWM Plus Phase Angle Shift (PPAS) Control Scheme for Combined Multiport DC/DC Converters", IEEE Transactions on Power Electronics, vol. 27, No. 3, Mar. 2012, pp. 1479-1489.
Mira, M. C., et al., "Analysis, Design, Modeling, and Control of an Interleaved-Boost Full-Bridge Three-Port Converter for Hybrid Renewable Energy Systems", IEEE Transactions on Power Electronics, vol. 32, No. 2, Feb. 2017, pp. 1138-1155.
Response to Communication Pursuant to Article 94(3) dated Dec. 14, 2023 for EP Application No. 20828746.6, date filed: Feb. 13, 2024.
Wu, H., et al., "Multiport Converters Based on Integration of Full-Bridge and Bidirectional DC-DC Topologies for Renewable Generation Systems", IEEE Transactions on Industrial Electronics, vol. 61, No. 2, Feb. 2014, pp. 856-869.
Zhu, L., et al., "A novel high efficiency high power density three-port converter based on interleaved half-bridge converter for renewable energy applications", 2014 IEEE Energy Conversion Congress and Exposition (ECCE), Sep. 2014.

* cited by examiner

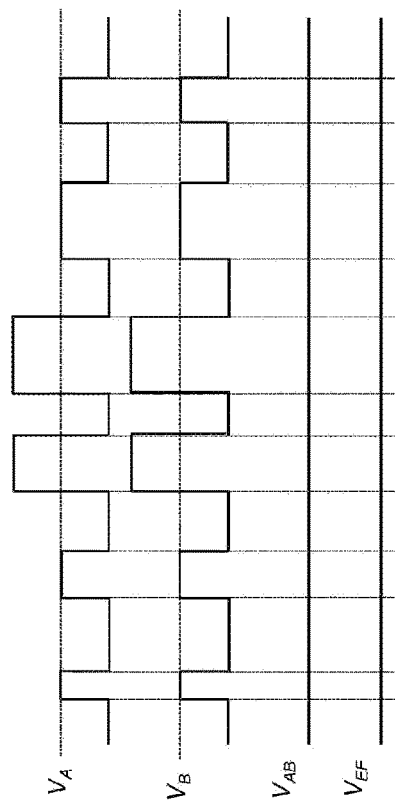
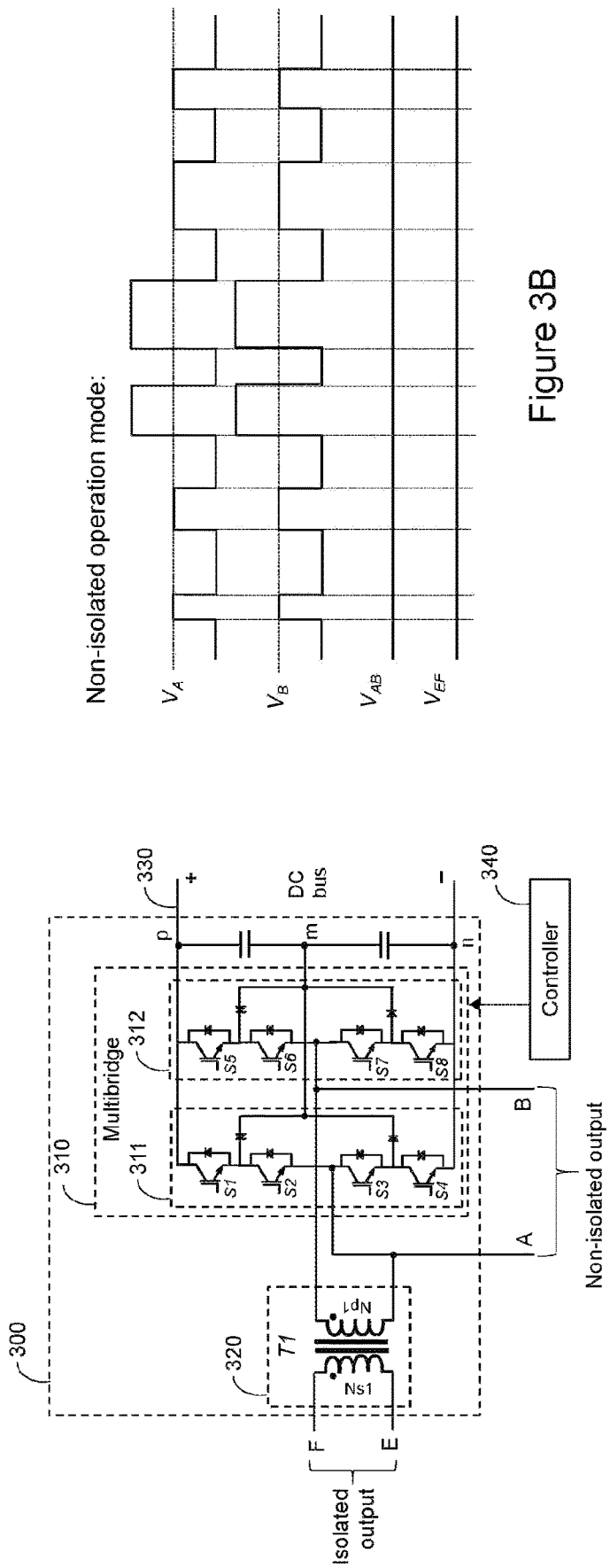
Figure 3B
Figure 3A

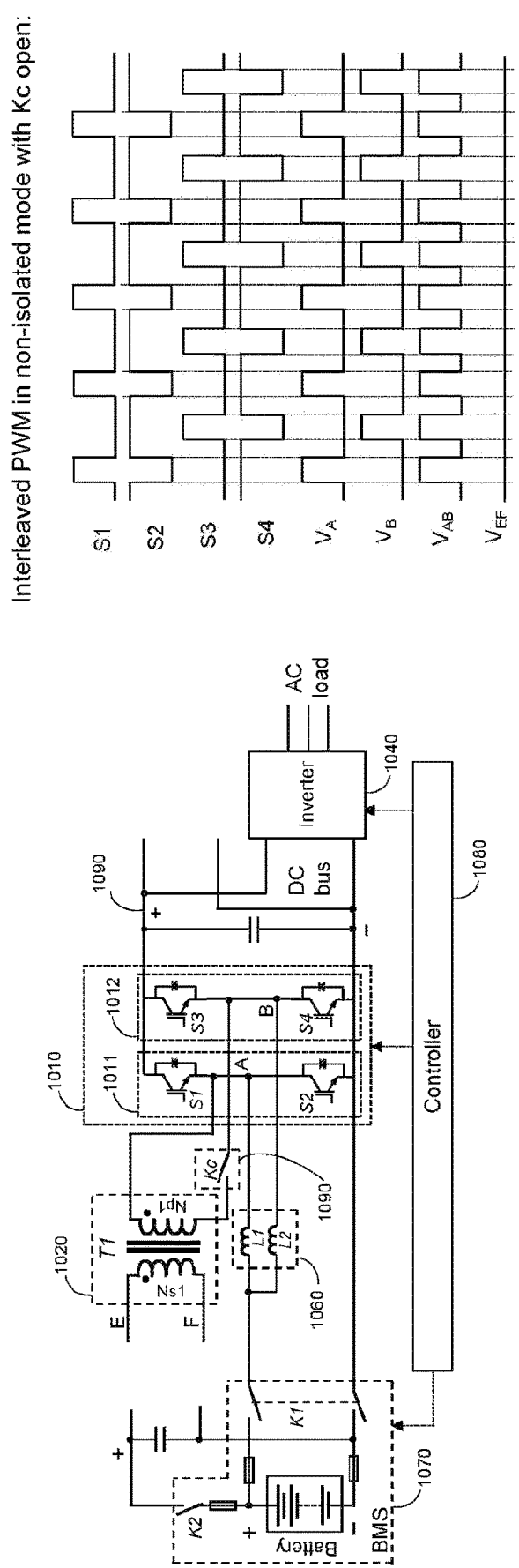
Figure 10D  Non-isolated operation mode

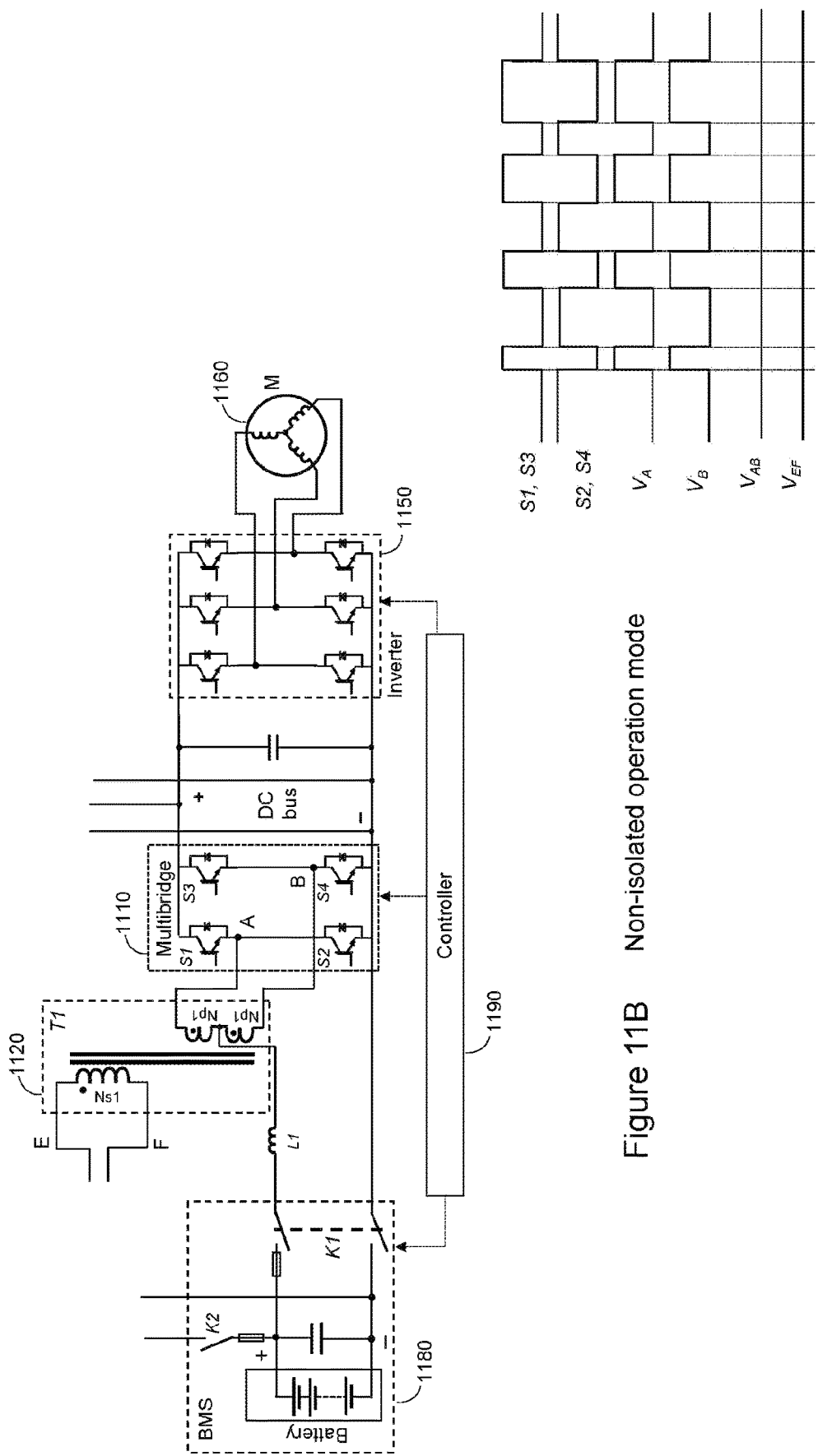
Figure 11B  Non-isolated operation mode

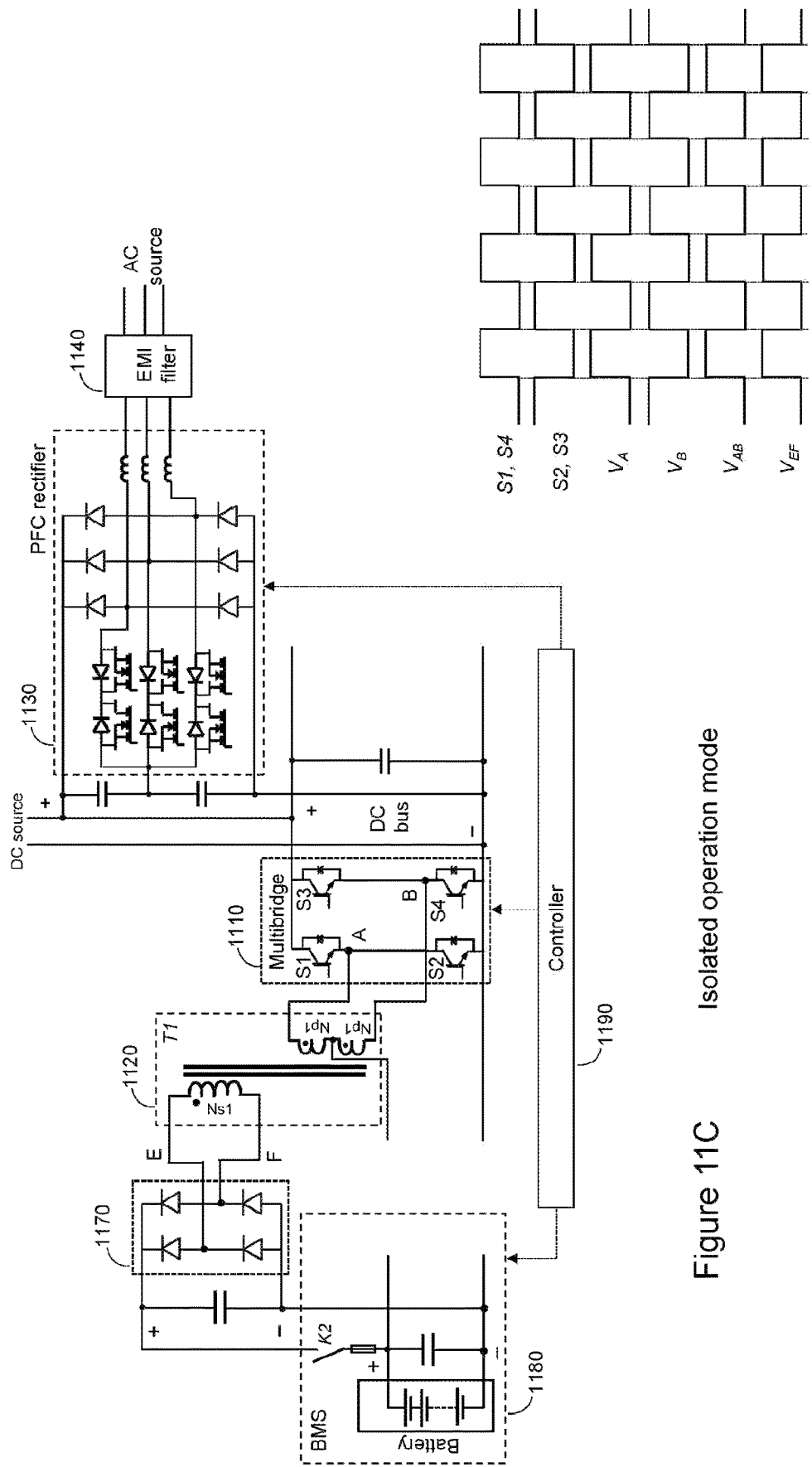
Figure 11C  Isolated operation mode

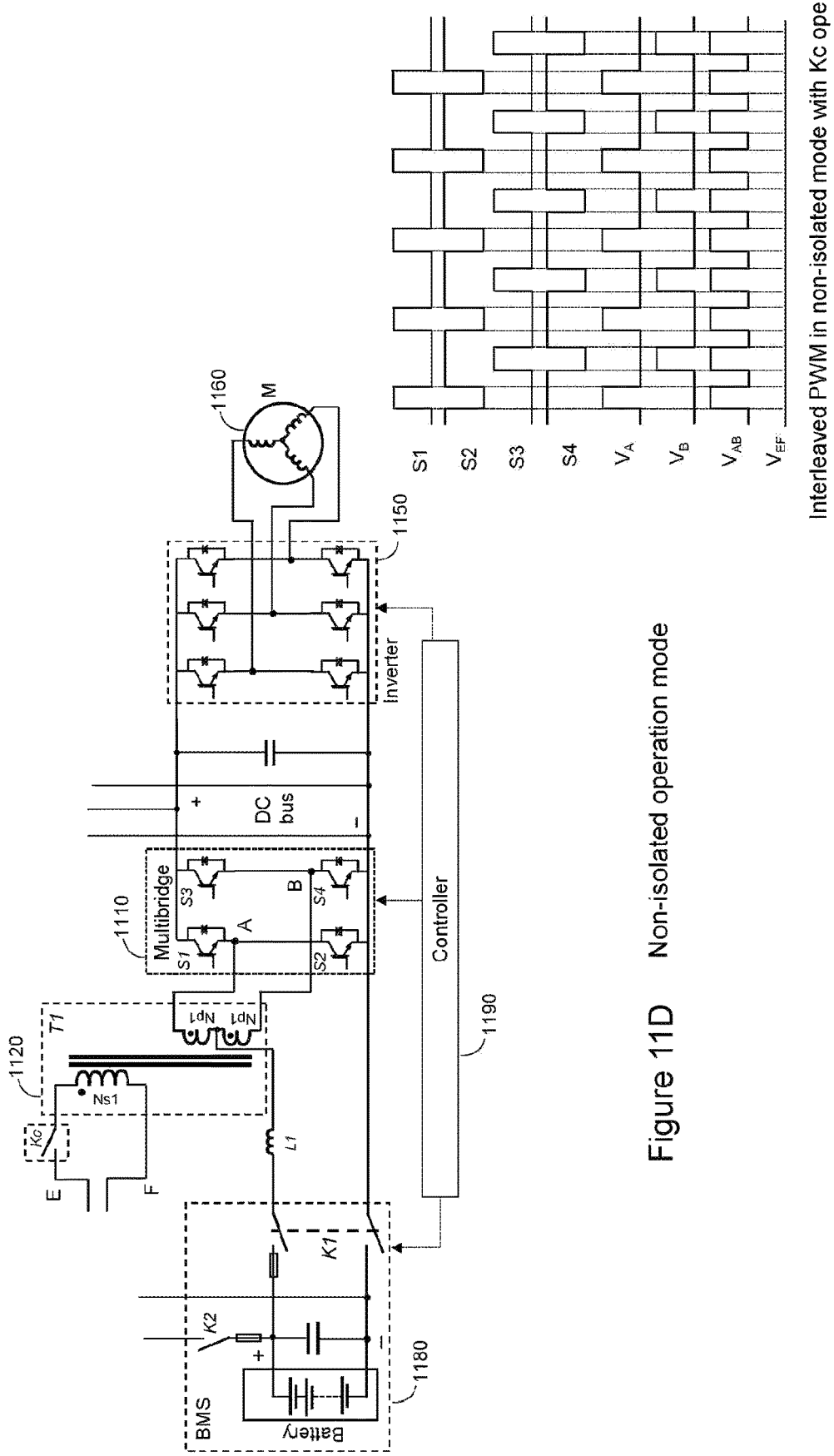
Figure 11D Non-isolated operation mode

MULTIBRIDGE POWER CONVERTER WITH MULTIPLE OUTPUTS

RELATED APPLICATIONS

This application is a continuation U.S. application Ser. No. 17/272,233, which is the U.S. National Stage of International Application No. PCT/US2020/055933, filed on Oct. 16, 2020, which designates the U.S., and claims priority under 35 U.S.C. § 119 or 365 to PCT/IB2019/001318, filed on Oct. 16, 2019. The entire teachings of the above applications are incorporated herein by reference.

TECHNICAL FIELD

The disclosure generally relates to the field of electric power circuits such as electric power converters used in electric vehicles.

BACKGROUND

Renewable energy industry has experienced rapid growth in recent years and further improvements in power electronics technologies are in high demand due to such growth. For example, as a large number of electric vehicles (EVs) have come onto market, motor drive inverters and battery chargers have become key components for the EVs. Demands for continuous improvement on cost, efficiency, size and weight raise up challenges for the EV motor drive inverter and battery charger designs.

The battery packs deployed in the EVs include a variety of different voltage and capacity ratings. Therefore, the EVs need suitable chargers for charging at a wide range of battery voltage and current levels, which causes challenges especially for battery charger product suppliers and commercial fast charger stations.

Battery charger power converters are potentially dangerous due to high voltages and high currents. Galvanic isolation may reduce electric safety hazards and can stop fault propagation in case of component failures in the power converters.

Therefore, the galvanic isolation may be required by some safety standards, such as IEC, IEEE, UL, and SAE, and this mandatory requirement is true for off-board chargers as well as on-board battery chargers (OBCs).

An EV battery charger comprises electrical circuits for converting alternating current (AC) power into direct current (DC) power, and is typically designed in two stages, i.e., an AC-to-DC stage and a DC-to-DC stage. The AC-to-DC stage is to convert an AC input voltage (typically from the AC utility source) to a DC bus voltage, and regulate the DC bus voltage to be within a desirable range suitable for the DC-to-DC stage as the load. The AC-to-DC stage may comprise a variety of electromagnetic interference (EMI) filters, and a power factor correction (PFC) converter circuit (or namely, PFC rectifier) employing multiple diodes and active switching devices.

The EMI filter is employed to reduce high frequency noise that may cause interference with other devices on board of the EV in order to meet various EMI regulations. The PFC converter circuit may be implemented as a Boost PFC converter, which is capable of shaping the input line current to be sinusoidal and in phase with the sinusoidal input voltage of the AC source and thus keeping the circuit operation at the unity power factor. Meantime, the PFC converter circuit regulates its output to maintain the DC bus voltage within a certain target range for stable power flow and safe operations.

As the stage following the AC-to-DC stage in the EV battery charger, a DC-to-DC stage is connected between the outputs of the DC bus and a plurality of batteries. The DC-to-DC stage may comprise a high frequency switching DC-DC converter feeding an isolation transformer typically having one primary winding and a secondary winding. On the secondary side, another rectifier circuit is provided for regulating the output of the secondary winding of the isolation transformer into a DC voltage for charging the EV battery. The DC-to-DC converter is also capable of regulating the battery charging current and maintaining the state of charge of the battery.

An inverter-based motor control unit (MCU) is used to drive the EV traction motor using battery power. The inverter is to convert the battery DC voltage into pulse-width-modulated (PWM) AC output voltage waveforms across the motor windings in order to regulate the motor winding currents as desired. The goal is to produce high torque at a low-speed region of the motor and deliver high power at a high-speed region of the motor as commanded by the MCU, which usually causes difficult problems in the motor and inverter system design tradeoff.

Typically, a high torque output of the motor requires more permanent magnet material in the rotor, which reduces the maximum motor winding currents and thus shrinks the motor frame size. However, more permanent magnet material of the rotor means a higher induced back electromagnetic force (EMF). When the back EMF reaches at the DC bus voltage level, the MCU will no longer be able to push more power into the motor or to drive the motor further into a higher-speed region. This design problem is usually resolved by field-weakening control with or without deploying of a DC-DC boost converter.

A technique called field-weakening control is used to counter-act a part of the permanent magnet flux and lower down the back EMF to fall below the DC bus voltage level at the motor high speed region. The drawback of the field-weakening operation is that the motor efficiency can be dramatically lowered, especially in some deep field weakening cases by several percentage points, which is obviously a hefty price to pay due to EV fuel economy. Moreover, the inverter will have to tolerate larger reactive current at the field-weakening operation, leading to higher device rating and cost and further lower inverter efficiency.

A DC-DC boost converter can be used to insert between the battery and the DC bus that supplies power to the inverter. When the motor operates at a high speed, the boost converter can increase the DC bus voltage. As a result, the inverter can generate higher output voltages across the motor windings to overcome the back EMF and thus achieve the continuous power delivery at a higher motor speed region without field weakening. This boost converter solution comes with additional cost, but the cost can be offset to some extend on the inverter side due to increased inverter efficiency and motor efficiency as well.

Powertrain components including the motor, the inverter, and the on-board battery charger contribute to a significant portion of total EV material costs. Typical EV inverters are normally rated at 60 kW to 200 kW because of the peak power demand from the motor drives. On-board battery chargers are rated at 6 kW to 22 kW only due to cost and space limitations. The inverters do not require isolation, but OBC power stage does require transformer isolation. Therefore, due to differences in isolation necessity and power ratings, inverters and OBCs are usually embodied by separate hardware and different subsystems, respectively.

For further cost saving and size or weight reduction, there is a real need to investigate the possibility of integrating the inverter and the OBC system and reusing common power converter hardware between the EV motor drive operation and the battery charging operation. In fact, there have been a lot of publications on the inverter and OBC integration. However, a suitable and practical solution in the critical area of power converter topologies is still missing for providing the required isolation and compact integration of the inverter and the OBC system.

SUMMARY

These and other problems are generally considered as solved or circumvented, and technical advantages are generally achieved, by preferred embodiments of the present disclosure which proposes a new concept of multiple-bridge converter (i.e., multibridge converter) with multiple outputs. A multibridge converter typically includes two switching bridges connected to a Direct Current (DC) bus with each bridge generating pulse-width-modulated (PWM) voltages to non-isolated outputs. An isolation transformer has a primary winding connected across the two bridge outputs and a secondary winding connected to isolated outputs. With the same set of converter hardware, different gate timing controls are used for generating different PWM voltage waveforms and delivering DC bus power either to the non-isolated outputs or to the isolated output, but not both at the same time. In the non-isolated mode, the two switching bridges are operated in a parallel mode, and power is transferred between the DC bus and the non-isolated outputs. In the isolated mode, the two switching bridges are operated in a full bridge mode, and power is transferred between the DC bus and the isolated outputs through the transformer.

In the non-isolated mode, the multibridge converter bridges are operated in parallel mode with their gate switching signals synchronized in phase (i.e., with no phase shift) to generate the same PWM voltage waveforms across the transformer. Thus the transformer winding is not excited with any intended significant differential voltages and no significant power is delivered across the transformer. Therefore power is transferred mainly from the DC bus to the non-isolated outputs, with the capability of bidirectional power flow.

In the isolated mode, the multibridge converter bridges are controlled to operate in full bridge mode, and their gate switching signals are phase shifted and out of phase, therefore the transformer winding is excited with intended significant differential voltages and power is delivered mainly from the DC bus to the isolated outputs through the transformer, with the capability of bidirectional power flow. Care must be taken here to minimize or stop any power flow to the non-isolated load, which may require special arrangement of load segment configurations. At any rate, using the same hardware, the multibridge converter can transfer power to non-isolated outputs vs. isolated outputs under different gate timing controls.

Generally, when multiple switching bridges are operated in parallel, it's well known to have an interleaved operation with a phase shift between the bridges in the synchronized PWM gate switching signals. The benefits include a higher effective PWM switching frequency, a lower output voltage and current switching ripple, and a lower EMI noise spectrum potentially. To achieve an interleaving PWM operation with the proposed multibridge converter, an additional disconnect switch is connected in series with the transformer winding, either on the primary side or the secondary side. In the non-isolated operation mode when power is transferred between the DC bus and the non-isolated outputs, the transformer disconnect switch is open and PWM switching of the bridges are synchronized and interleaved with a phase shift angle. In the isolated operation mode, the transformer disconnect switch is closed, the two bridges are controlled to operate in full bridge mode, the PWM switching signals are phase shifted and out of phase between the two bridges, and power is transferred between the DC bus and the isolated outputs through the transformer.

Under the same ideas of the present disclosure, multibridge converter switching bridges can use two-level, three-level, five-level, or any multilevel converter topologies, such as diode neutral-point-clamp (NPC) multilevel converter, active neutral-point-clamp (ANPC) multilevel converter, flying-capacitor multilevel converter, or a combination of any different multilevel topologies between the bridges.

Similarly, examples are given in this present disclosure that multibridge converter can include three, four or any higher number of switching bridges, either connected to multiple separate isolation transformers, or to the same isolation transformer with multiple windings that are coupled together, or to a mixture of different transformer designs.

As an example circuit in accordance with various embodiments of the present disclosure, the multibridge converters are configured as a three-phase PWM inverter for an integrated EV motor drives and on-board charging system, comprising: a battery pack of many battery cells connected to DC bus through a DC main contactor or switch; three multibridge converters to form an DC-to-AC inverter operation for non-isolated outputs to drive an AC motor; isolation transformer, having a primary winding connected across the converter bridge outputs and a secondary winding connected to a rectifier of any type for outputting DC power to charge the battery pack. A power source is connected to the DC bus, either from an external DC source directly connected to the DC bus, or from an external AC source which is indirectly connected through an AC-to-DC rectifier.

A controller operates the three-phase multibridge converter with PWM synchronization and phase shifting. During inverter drive operation in the non-isolated mode, when the battery contactor is closed and external source is not plugged in, within each multibridge converter the two switching bridges are operated in a parallel mode, and power is transferred between the DC bus and the non-isolated outputs. During battery charging operation in the isolated operation mode, while the external source is plugged in and, the battery contactor is open, within each multibridge converter the two switching bridges are operated in a full bridge mode, and power is mainly transferred between the DC bus and the isolated outputs through the transformers.

Here the EV motor needs to be a double-winding motor or double-segment winding AC motor, where the two sets of motor windings are separated from each other. Each set of motor windings is most often seen as Y-configuration. During battery charging operation in the isolated operation mode, additional gate switching synchronization is applied among those switching bridges connected across the same set of motor phase windings, therefore each set of motor windings are excited with virtually zero differential voltages across the motor terminals in order to reduce any unintended motor circulating currents.

As an example circuit in accordance with various embodiments of the present disclosure, the multibridge converters are configured as a DC-DC boost converter for an integrated EV drive and on-board charging system. The apparatus comprises two switching bridges formed as DC-to-DC boost converter outputting to the DC bus that feeds EV drive inverter and AC motor; an isolation transformer which has a primary winding connected across the converter bridge outputs and a secondary winding connected to a rectifier for outputting a DC power to charge a battery pack; the same battery pack also connected to a DC contactor, then to Boost inductors, and then to the mid-point outputs of the converter bridges; and there also a source connected to the DC bus directly or indirectly through a power converter.

A controller operates the multibridge converter with PWM synchronization and phase shifting. During EV drive Boost operation in the non-isolated operation mode, the battery contactor is closed and external source is not plugged in, within each multibridge converter the two switching bridges are operated in a parallel mode, and power is transferred from the battery to the DC bus, with bidirectional capability. During battery charging operation in the isolated operation mode, the battery contactor is open and external AC source is plugged in, within each multibridge converter the two switching bridges are operated in a full bridge mode, and power is transferred between the DC bus and the isolated outputs through the transformers.

For further cost saving, the Boost inductors can be integrated in part or in whole into the isolation transformer magnetics design, and, the battery input through the main contactor is connected to the middle point of the isolation transformer primary windings, therefore the transformer windings are used as coupled Boost inductors, with or without any additional separate inductor(s).

According to various aspects of the present disclosure, the AC-DC converter (i.e., PFC rectifier) may be not completely additional set of hardware, rather the rectifier hardware and power-factor-correction function can be integrated and realized by operating part or whole sets of the inverter bridges in reverse power direction to draw power from the AC source, with or without using the motor windings as inductors required by the PFC rectifier.

Optionally, in any of the preceding aspects, the multiple isolation transformers across the multibridge converters may be separate transformers, or may be an integrated transformers with multiple primary windings coupled on the same core structure and with common secondary windings.

Optionally, in any of the preceding aspects, the AC motor may have multiple sets of separate armature windings, with each winding set supplied by separate inverter phase output of multibridge converters. This separate winding configuration avoids any potential circulating currents in motor windings due to common mode voltage.

Optionally, in any of the preceding aspects, the multibridge converter may drive multiple individual AC motors and each motor is supplied by separate inverter phase output of the multibridge converters.

In a simplified form, the foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

For example, in the present disclosure it is shown that multibridge converter is configured as DC-AC inverter and DC-DC Boost circuit in the non-isolated operation mode. While it is not shown here that multibridge converter is configured to form a DC-DC Buck circuit in the non-isolated operation mode. In fact, it is much easier to draw a multibridge converter in DC-DC Buck circuit and it is under the same concept and exact idea taught in this present disclosure.

For another example, a disconnect switch is shown in series with the isolation transformer winding on the primary side or the secondary side to allow more functions and better performance. Similarly, a disconnect switch can be connected in series with the non-isolated output of the multibridge converter which could reduce any unintended power loss or simply make control easier. However, such modifications as adding a disconnect switch anywhere in the circuit do not depart from the spirit and scope of the present disclosure as set forth in the appended claims.

For another example, the isolated DC-DC charging circuit illustrated in the present disclosure are mainly full-bridge phase-shift converter, LLC converter, or dual active bridge (DAB) converters. It should be understood that other isolated DC-DC topologies or a combination of different topologies are also applicable and well suitable for the multibridge converter circuit implementations. And such modifications using other different DC-DC topologies do not depart from the spirit and scope of the present disclosure as set forth in the appended claims.

BRIEF DESCRIPTION OF THE DRAWINGS

Aspects of the present disclosure are illustrated by way of examples and are not limited by the accompanying figures.

FIGS. 3A to 3C illustrate a circuit example of multibridge converter using a three-level bridge topology and its operation waveforms in accordance with various embodiments of the present disclosure;

FIG. 10D illustrates the circuit example shown in FIG. 10A having an additional transformer disconnect switch with example switching waveforms in non isolated mode;

FIG. 11B illustrates the equivalent circuit of the circuit shown in FIG. 11 A in a non-isolated operation mode with example switching waveforms;

FIG. 11C illustrates the equivalent circuit of the circuit shown in FIG. 11 A in an isolated operation mode with example switching waveforms;

FIG. 11D illustrates the circuit example shown in FIG. 11A having an additional transformer disconnect switch with example switching waveforms in non isolated mode;

DETAILED DESCRIPTION

Figure 1B:
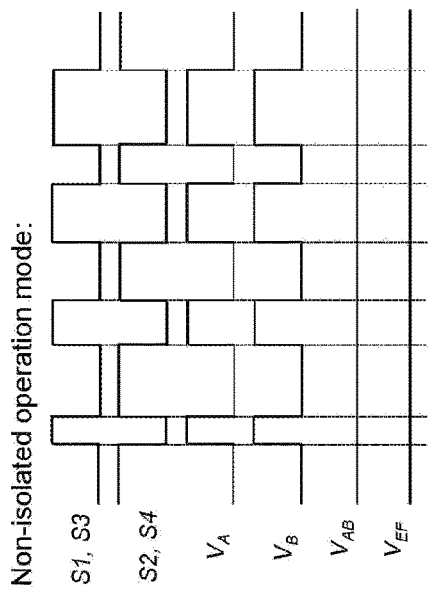
FIGS. 1A to 1D illustrate a circuit example of a multibridge converter and its operation waveforms in accordance with various embodiments of the present disclosure.
Figure 1C:
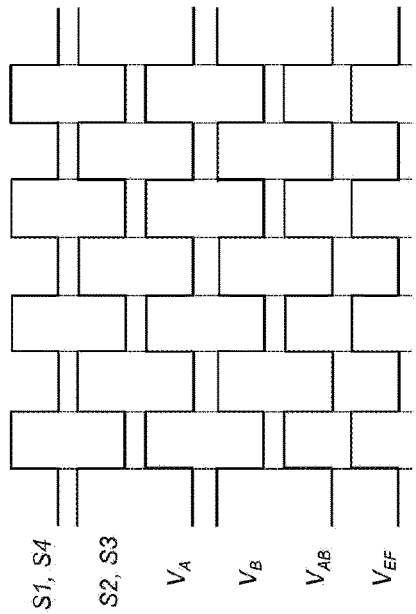

The present disclosure will now be described with reference to the Figures, which in general relate to electric power circuits that may be used, for example, in an electric vehicle. For example, circuits described here may be used for charging a battery from an external source and for controlling power to drive an electric motor using the battery.

EV power systems are sensitive to component dimension, weight, and converter efficiency. Main stream power converter designs using conventional metal-oxide-semiconductor field-effect transistor (MOSFET) and insulated-gate bipolar transistor (IGBT) have hit their performance limits, and new-generation power devices such as Gallium Nitride (GaN) and Silicon Carbide (SiC) MOSFET transistors are being adopted for efficiency, dimension and weight benefits. Also, using shared hardware circuitry to perform different functions such as driving a motor and charging a battery is efficient and may save costs; and integrating motor drives and battery charging systems may provide further gains in cost and dimensions.

Generally, EVs should be able to charge their batteries from at least two different power sources, e.g., DC power from a charging station, and AC power from the utility AC grid. Therefore, EV on-board power systems may include both DC and AC charging circuits, in addition to an inverter circuit that operates the EV motor during a drive mode or a traction mode.

Charging of EV batteries may include use of an on-board charging circuit. Power from the battery may be used to power one or more electric motors through an inverter to propel the electric vehicle. In some cases, certain components may be shared by these circuits, which may reduce costs and promote efficiency. Integration of the on board charging circuit and the inverter circuit using an advanced high-frequency circuit topology and using common power converter stages (e.g. power bridges) between the on-board charger and the inverter may reduce the overall cost, size, and weight of the EV power system. However, any integrated solutions also need to address those technology challenges brought about by different power ratings, isolation requirements, and a wide voltage range.

It is understood that the present embodiments of the disclosure may be implemented in many different forms and that the claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the embodiments of the disclosure, numerous specific details are set forth in order to provide a thorough understanding. However, it will be clear to those of ordinary skill in the art that the embodiments of the disclosure may be practiced without such specific details.

Figure 1A:
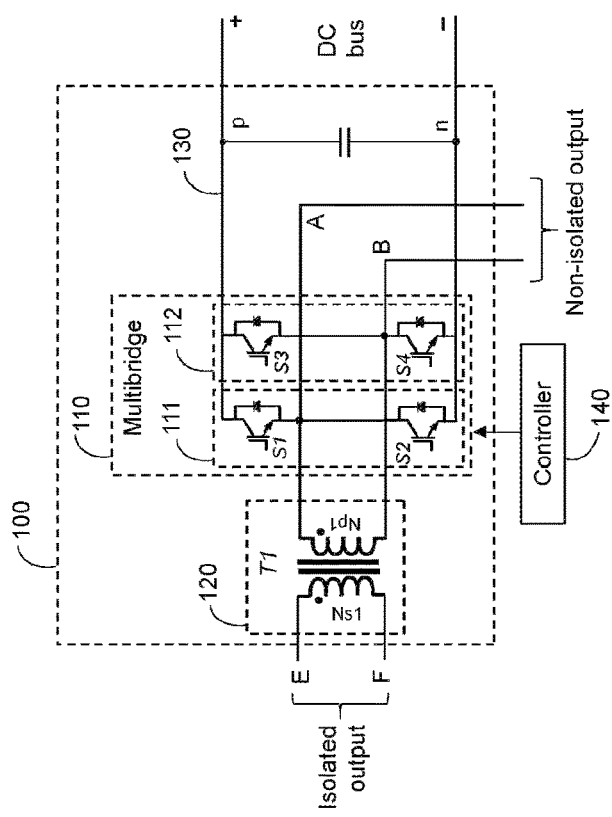
Figure 1D:
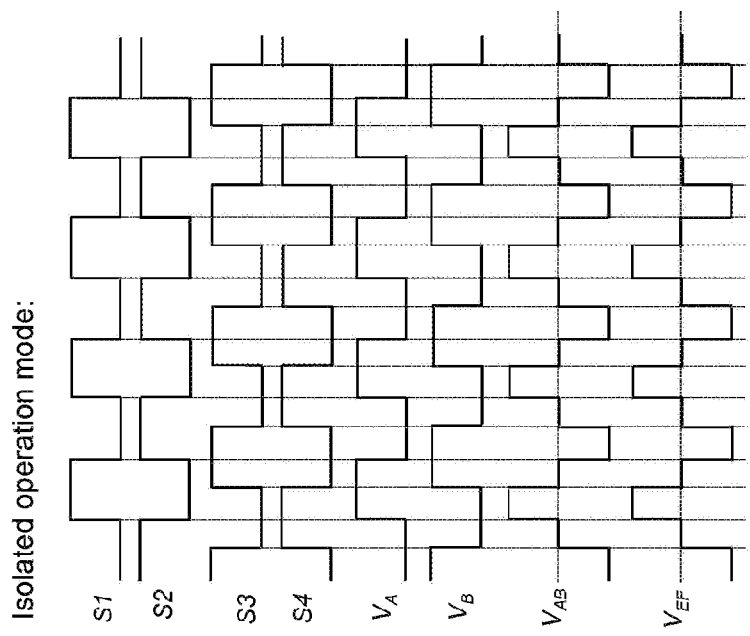

FIG. 1A illustrates a concept diagram of a multibridge converter 100, comprising a multibridge 110 (which consists of two switching bridges, i.e., phase-A bridge 111 and phase-B bridge 112, but may also consist of more than two switching bridges, as desired in various embodiments) connected to a DC bus 130 and coupled with an isolation transformer 120 having a primary winding connected between an output (i.e. port A) of the phase-A bridge 111 and an output (i.e. port B) of the phase-B bridge 112. With a controller 140 generating and providing different PWM gate control signals to the multibridge converter 100, the multibridge converter 100 can be operated in at least two different modes including: (i) a non-isolated operation mode where the two switching bridges are operated in a parallel mode, and power is delivered from the DC bus 130 to the non-isolated ports A and B, and (ii) an isolated operation mode where the two switching bridges are operated in a full bridge mode, and power is delivered from the DC bus 130 to the isolated ports E and F though the isolation transformer 120. In general, the multibridge converter 100 can be used in DC-to-DC or DC-to-AC inverter systems.

FIG. 1 B illustrates an example of switching waveforms for the non-isolated operation mode of the multibridge converter 100. For simplicity all the deadtime in each bridge's PWM signals are neglected, and that is true with all the other example waveforms throughout this disclosure. The two switching bridges 111 and 112 are synchronized in gate on-off signals to generate the same PWM voltage waveforms with no phase shift across the primary winding of the transformer 120, therefore the primary winding of the transformer 120 is not excited with any significant differential voltages (i.e., voltage VAB, representing the voltage between the port A and the port B) and power is delivered mainly from the DC bus to the non-isolated ports A and B, with the capability of bidirectional power flow. The rule of switching in the non-isolated operation mode is that the phase-A bridge 111 and the phase-B bridge 112 are fully synchronized in phase and switching devices S1 and S2 (such as IGBT, Silicon MOSFET, and Silicon-carbide MOSFET) in the phase-A bridge 111 are turned on and off by the same gating signals as switching devices S3 and S4 (such as IGBT, Silicon MOSFET, and Silicon-carbide MOSFET) in the phase-B bridge 112. In other words, the phase-A and phase-B bridges 111 and 112 work in perfect synchronization usually because they are controller by the same PWM gating signals. And the common PWM gating signals are typically generated by a multivariable input-to-output close-loop regulations in terms of duty cycle control or space-vector modulations of the converter 100. The result is that the primary winding of the transformer 120 is excited by the identical voltage waveforms of the voltage VA from the phase-A bridge 111 and the voltage VB from the phase-B bridge 112, and therefore the voltage VEF across the secondary winding of the transformer 120 will be flat, ideally standing at "0" voltage. So power is delivered from the DC bus 130 to the non-isolated ports A and B, but not to the isolated ports E and F. It is note that, in this non-isolated operation mode with non-perfect gate signal synchronization, the switching devices of the phase-A bridge 111 and the phase-B bridge 112 may not turn on and off at the same timing, and short voltage pulses or glitches may be seen at the secondary ports E and F of the transformer 120, but those short pulses can be tolerated due to the fact they will not deliver any significant portion of the total power flow.

FIG. 1 C illustrates an example of switching waveforms for the isolated operation mode of the multibridge converter 100. In this mode, the two switching bridges 111 and 112 are operated in a full bridge mode, the PWM switching signals are phase shifted with 180° and exactly in opposite phase between the two bridges, therefore the winding of the transformer 120 is excited with intended significant differential voltages and power is delivered mainly from the DC bus 130 to the isolated outputs (i.e. the isolated ports E and F) through the transformer 120, with the capability of bidirectional power flow. The phase-A bridge 111 and the phase-B bridge 112 are out of phase and not turned on and off by the same gate timing signals. In fact, the two bridges 111 and 112 can be operated in the opposite phase, where the switching device S1 of the phase-A bridge 111 and the switching device S4 of the phase-B bridge 112 are typically turned on at the same time, while the switching device S2 of the phase-A bridge 111 and the switching device S3 of the phase-B bridge 112 are typically turned on at the same time, without any intended phase shift. The result is that the isolated ports E and F of the transformer 120 generate a square-shape waveform or alike, and therefore power is mainly delivered from the DC bus 130 to the isolated ports E and F. It is worth noting that in this isolated operation mode, the purpose is to minimize the power flow to the non-isolated ports A and B, and to achieve that goal, some caution or special arrangements may be needed with the load wirings or load configurations connected to the non-isolated ports A and B.

FIG. 1 D illustrates another example of switching waveforms for the isolated operation mode of the multibridge converter 100. Here the two switching bridges operate in full bridge mode with an intended phase shift on the PWM switching signals, (i.e., S1/S2 vs. S3/S4) between the two phase bridges. For simplicity the deadtime in each bridge's PWM signals is neglected. As a result, the PWM voltage output across the transformer primary winding VAB has a bipolar waveform, i.e., having positive and negative DC bus voltage alternatively with zero voltage transition in the middle. And that same bipolar waveform will appear in the transformer secondary winding voltage VEF, neglecting all the parasitic effects. In fact, the active duty cycle or pulse width of the positive-negative voltage waveform depends on the phase shift angle; therefore, adjusting this phase shift angle between the two bridges' PWM gating signals will regulate the power flow to the isolated load through the transformer. The detailed gate timing is usually dependent on the close-loop regulation method of the converter 100, such as PWM, frequency modulation, phase shift control, etc. In fact it is operated the same way like a conventional full-bridge phase-shift or LLC converter.

Figure 2B:
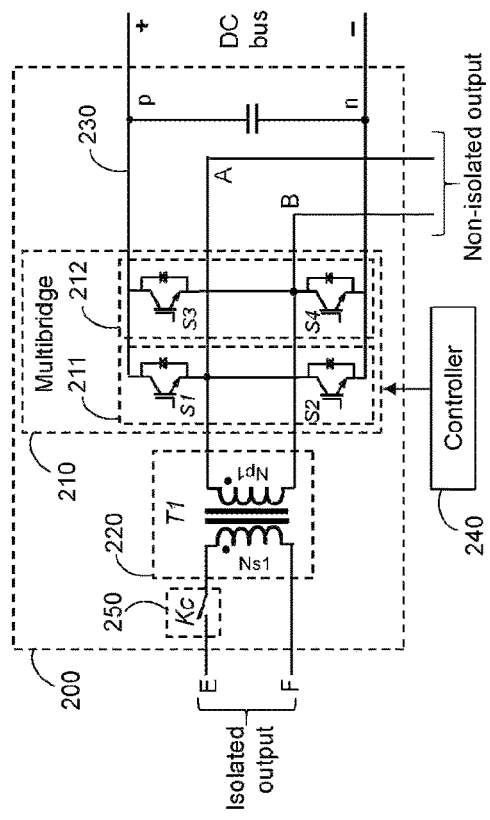
FIGS. 2A to 2D illustrate two circuit examples of a multibridge converter with an additional transformer disconnect switch and its operation waveforms in accordance with various embodiments of the present disclosure.
Figure 2A:
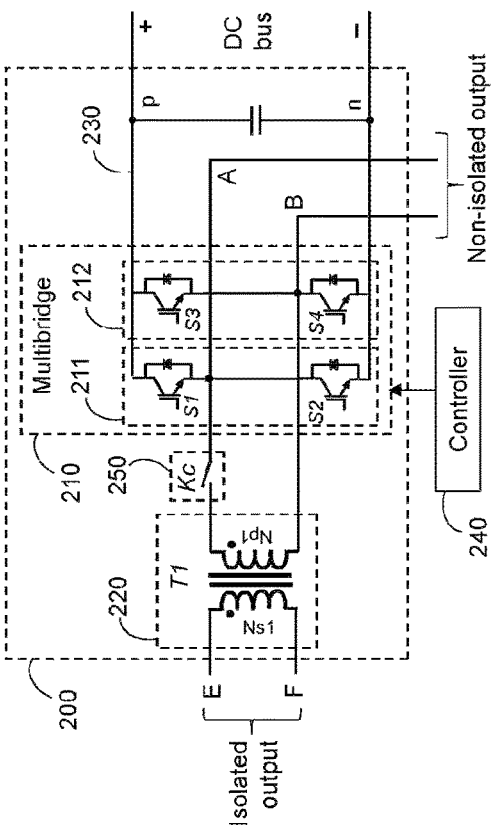

FIGS. 2A-2B illustrate an example of a multibridge converter and its operation waveforms in accordance with various embodiments of the present disclosure. Circuits in FIGS. 2A and 2B are almost identical as that in FIG. 1A, but merely differ from that in FIG. 1 in that an additional disconnect switch 250, namely Kc, is connected between the output port A or B of the multibridge 210 and the isolated port E or F across the transformer 220, and this disconnect switch Kc can be in series with the transformer either on the primary winding side as shown in FIG. 2A or on the secondary winding side in FIG. 2B. With the help of this disconnect switch Kc, the purpose is to introduce a phase shift angle in the synchronized PWM signals and achieve the PWM interleaving operation among the two bridges 211 and 212 of the multibridge converter 200 during the non-isolated operation in parallel mode. This disconnect switch Kc can be anything like contactor, relay, or semiconductor device switches. Parallel bridge PWM interleaving is well known for the benefit of increasing the effective PWM frequency on the output terminal and hence reducing the output voltage and current ripple and potentially mitigating electromagnetic emissions (EMI) and audible noises.

Figures 2C, 2D:
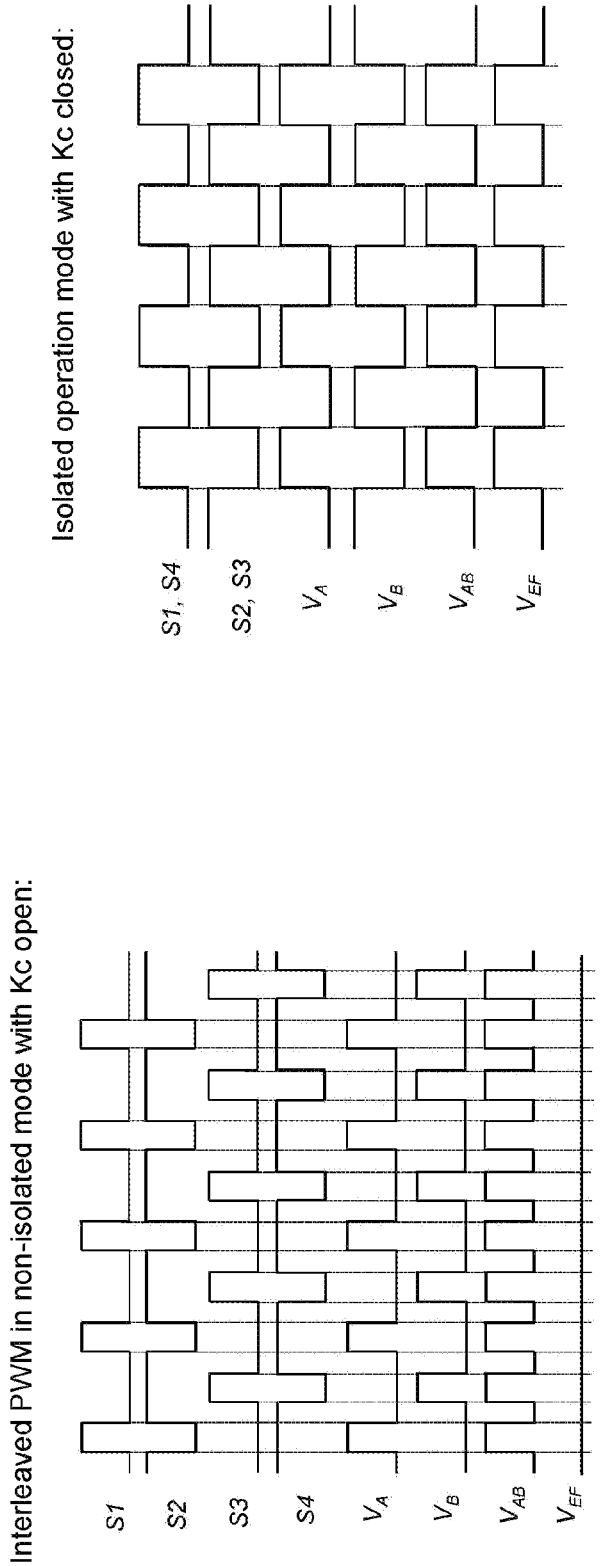

FIG. 2C shows an example of PWM interleaved switching waveforms in the non-isolated operation mode of the multibridge converters 200. In this mode, the disconnect switch Kc remains open and therefore the isolation transformer is not active in the circuit functions. Across the two switching bridges 211 and 212, there is a 180° phase-shift angle between their synchronized PWM gating signals. As such, the load output voltage VAB will cause the effective PWM switching frequency to double, leading to a smaller PWM switching ripple and lower EMI noises across the load etc.

FIG. 2D shows that in the isolated operation mode of the multibridge converters 200 while the disconnect switch Kc remains closed, circuit operations of the multibridge converter 200 are the same as in full bridge mode and the output waveforms are identical to the case in FIGS. 1 A to 1C without disconnect switch Kc. In essence, FIGS. 2A to 2D are under the same circuit concept of FIGS. 1A to 1 C, with an additional feature on PWM phase-shift interleaving and improved performance.

FIG. 3A illustrates a concept circuit diagram of a three-level multibridge converter 300 as an example. A multibridge 310 connected to a DC bus 330 consists of two switching bridges (i.e. a phase-A bridge 311 and a phase-B bridge 312) using diode NPC three-level topology. Similarly, the same concept can be applied to other multilevel topologies such as ANPC, flying capacitor, or hybrid multilevel converters. A primary winding of an isolation transformer 320 is connected across an output of the phase-A bridge 311 and an output of the phase-B bridge 312, namely, ports A and B. The secondary winding of the transformer 320 provides an isolated output at ports E and F.

With the controller 340 generating different PWM gating signals, the three-level multibridge converter 300 can be operated in at least two different modes including: (i) a non-isolated operation mode where the two switching bridges are operated in a parallel mode, the PWM switching signals are synchronized in phase between the two bridges, and power is delivered from the DC bus 330 to the non-isolated ports A and B, and (ii) an isolated operation mode where the two switching bridges are operated in a full bridge mode, the PWM switching signals are phase shifted and out of phase between the two bridges, and thus power is delivered from the DC bus 330 to the isolated ports E and F though the isolation transformer 320. The three-level multibridge converter 300 can be used in DC-to-DC or DC-to-AC inverter systems.

FIG. 3B illustrates an example of switching waveforms in the non-isolated operation mode of the multibridge converter 300. The rule of switching in the non-isolated operation mode is that the phase-A bridge 311 and phase-B bridge 312 are fully synchronized in phase and work in perfect parallel with the same PWM gate signals. The result is that the primary winding of the transformer 320 is excited by the identical voltage waveforms from the port A and the port B, and therefore the secondary winding of the transformer 320 will remain at "0" voltage. So power is mainly delivered from the DC bus 330 to the non-isolated ports A and B, but not to the isolated ports E and F. Note that, in this non-isolated operation mode with non-perfect gate signal synchronization, switching devices S1 to S4 of the phase-A bridge 311 and switching devices S5 to S8 of the phase-B bridge 312 may not turn on and off at exactly the same timing, and short voltage pulses or glitches may be seen at the secondary ports E and F of the transformer 320. But such short voltage pulses can be tolerated due to the fact they will not deliver any significant portion of the total power flow.

Figure 3C:
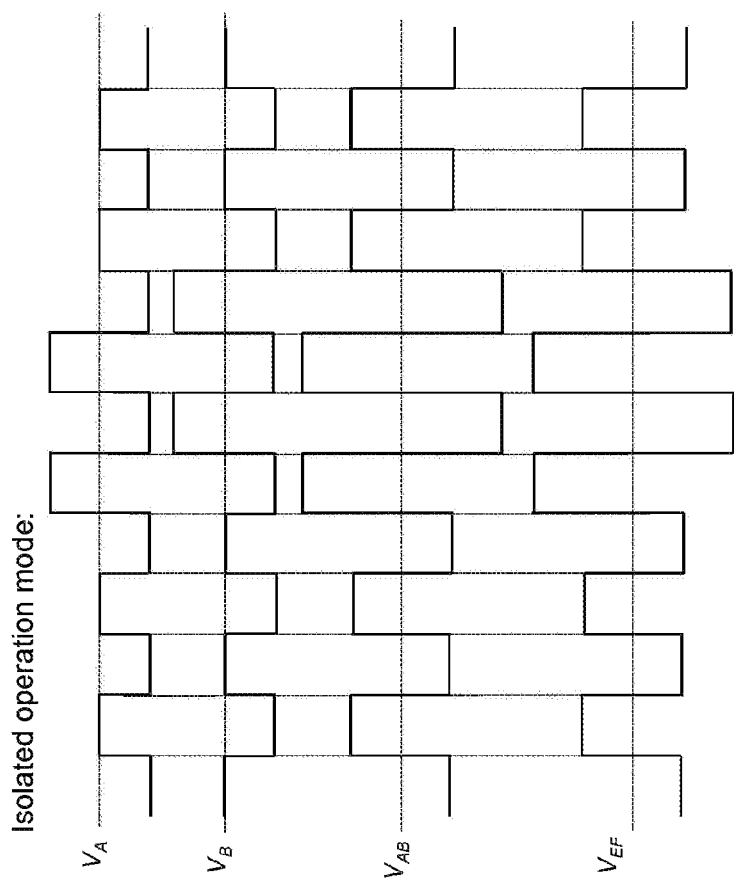

FIG. 3C illustrates an example of switching waveforms in the isolated operation mode of the multibridge converter 300. In this mode, the phase-A bridge 311 and the phase-B bridge 312 are phase shifted and out of phase and not turned on and off by the same gate timing signals. The result is that the isolated ports E and F of the transformer 320 generate a multi-step square-shape waveform or alike, and therefore power is mainly delivered from the DC bus 330 to the isolated ports E and F. In fact, the two bridges 311 and 312 are operated much like a conventional three-level full-bridge phase-shift or LLC converter. The detailed gate timing is usually dependent on the close-loop regulation method of the converter 300, such as PWM, frequency modulation, phase shift control, etc. It is worth noting that in this isolated operation mode, the purpose is to minimize the power flow to the non-isolated ports A and B, and to achieve that goal, some special arrangements may be needed with the load configurations connected to the non isolated ports A and B.

Figures 4A, 4B:
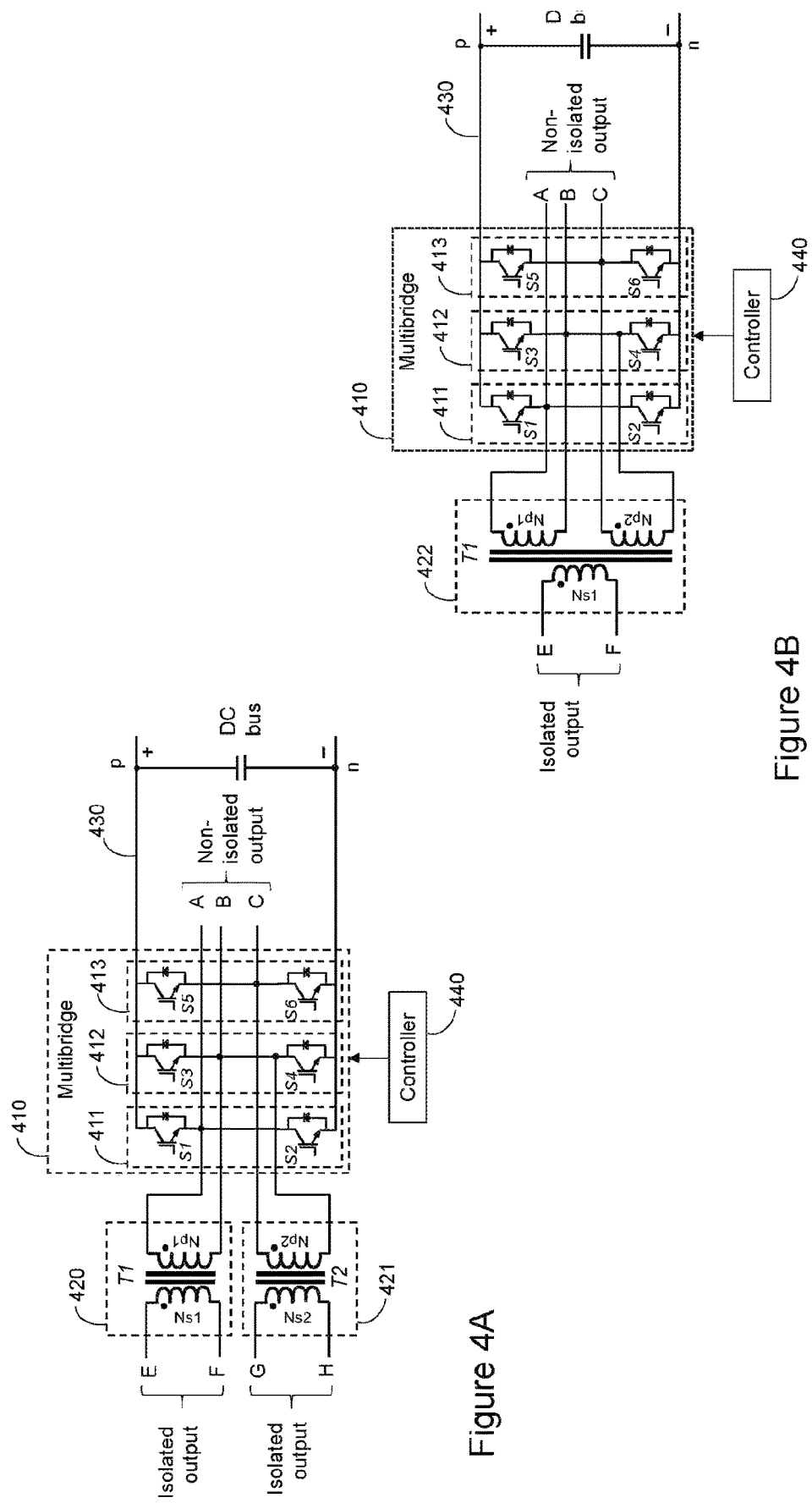
FIGS. 4A to 4D illustrate two circuit examples of multibridge converter using three switching bridges and its operation waveforms in accordance with various embodiments of the present disclosure.

FIG. 4A illustrates a concept circuit diagram of a three-bridge multibridge converter 410 connected to two separate isolation transformers 420 and 421. There are three switching bridges connected to the DC bus, namely a phase-A bridge 411 with an output port A, a phase-B bridge 412 with an output port B, and a phase-C bridge 413 with an output port C. A primary winding of the isolation transformer 420 is connected across the port A and the port B, and a primary winding of the isolation transformer 421 is connected across the port C and the port B. The secondary windings of the two transformers 420 and 421 provide isolated outputs at ports E and F and at ports G and H, respectively. Note the polarities of the multiple transformer windings need to be arranged in the same way as shown in order to match the switching waveforms illustrated below.

FIG. 4B illustrates a concept diagram of a three-bridge multibridge converter 410 connected to one integrated transformer 422. The only difference between FIG. 4A and FIG. 4B lies in the isolation transformer, but both of the isolation transformers of FIGS. 4A and 4B basically work in the same way. It is worth noting the polarities of the multiple transformer windings need to be arranged in the same way as shown in order to match the switching waveforms illustrated below.

Figure 4D:
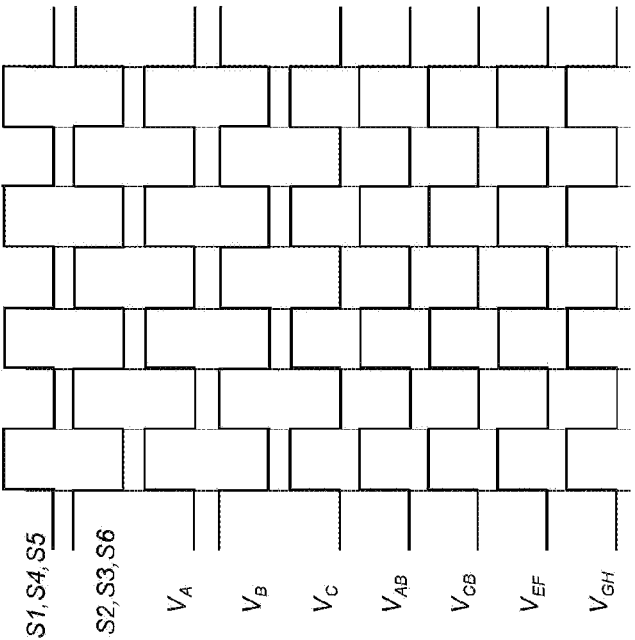
Figure 4C:
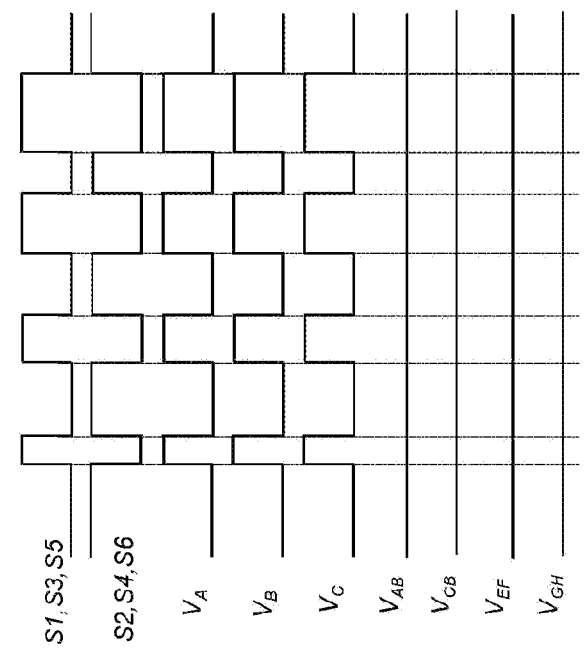

FIG. 4C illustrates an example of switching waveforms in the non-isolated operation mode of the circuit of FIG. 4A. The rule of switching in the non-isolated operation mode is that a phase-A bridge 411, a phase-B bridge 412 and a phase-C bridge 413 are fully synchronized and work in perfect parallel with the same PWM gate signals. The result is that primary windings of the two transformers 420 and 421 connected to voltages VA and VB at the ports A and B and voltages Vc and VB at the ports C and B are excited by the identical voltage waveforms, and therefore the output voltage VEF at the isolated ports E and F of the secondary winding of the transformer 420 and the output voltage VGH at the isolated ports G and FI of the secondary winding of the transformer 421 will stand still at "0" voltage. So power is mainly delivered from the DC bus to the non isolated ports A and B and the non-isolated ports C and B, but not to the isolated ports E and F, or ports G and FI. Note in this non-isolated operation mode with non-perfect gate signal synchronization, the phase-A, phase-B and phase-C bridges may not turn on or off at the same timing, and short voltage pulses or glitches may be seen at the ports E and F and the ports G and FI of the transformers 420 and 421. But the short voltage pulses can be tolerated due to the fact they will not deliver any significant portion of the total power flow.

FIG. 4D illustrates an example of switching waveforms in the isolated operation mode of the circuit of FIG. 4A. In this mode, the phase-A bridge 411 and the phase-B bridge 412 are out of phase and not turned on and off by the same gate timing signals. At the same time, the phase-C bridge 413 and the phase-B bridge 412 are out of phase as well. The result is that square-shape waveforms or alike are generated at the isolated ports E and F and the isolated ports G and FI of the transformers 420 and 421, and therefore power is mainly delivered from the DC bus to the isolated ports E and F and the isolated ports G and FI. In fact, the three bridges 411, 412 and 413 are operated much like a conventional full-bridge phase-shift or LLC converter. The detailed gate timing is usually dependent on the close-loop regulation method of the converter, such as PWM, frequency modulation, phase shift control, etc. It is worth noting that in this isolated operation mode, the purpose is to minimize the power flow to the non-isolated ports A, B and C, and to achieve that goal, some special arrangements may be needed with the load wirings or load configurations connected to the non-isolated ports A, B and C.

Figure 5A:
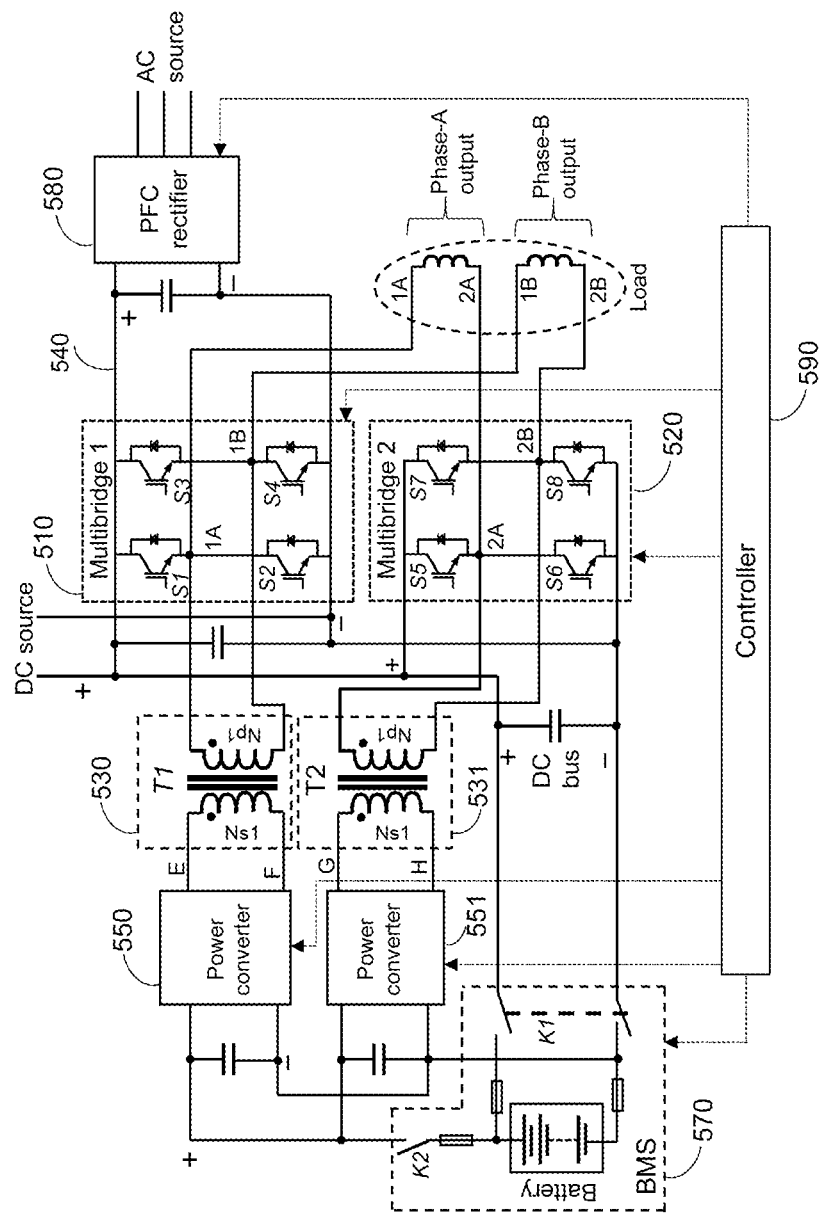
FIG. 5A illustrates a circuit example of multibridge converter-based single phase inverter integrated with a battery charging system in accordance with various embodiments of the present disclosure.

FIG. 5A illustrates an embodiment of a multibridge converter-based single phase inverter integrated with a battery charging system. There are two multibridges 510 and 520 connected to the DC bus, each multibridge 510 or 520 having two switching bridges. The multibridge 510 includes a phase 1A bridge and a phase 1 B bridge, and the multibridge 520 includes a phase 2A bridge and a phase 2B bridge. The two multibridges 510 and 520 form a non-isolated single-phase output with port 1 A of the phase 1 A bridge and port 2A of the phase 2A bridge, and a parallel single-phase non-isolated output with port 1 B of the phase 1 B bridge and port 2B of the phase 2B bridge. The multibridges 510 and 520 are connected to isolation transformers 530 and 531, respectively. Power converters 550 and 551 are connected to the secondary windings of the transformers 530 and 531 and function as a rectifier to generate a DC voltage for charging up the battery 570 through an optional contactor K2. The same battery 570 is also connected to the DC bus through a main contactor K1. Typically, battery 570 is packed with many modules of multiple cells having a battery management system (BMS) 570 for electric safety and thermal protections. In addition, there is also a PFC rectifier 580 connected between the DC bus and an external AC power source. A controller 590 controls gate timing of the phase bridges of the multibridges 510 and 520 according to two different operation modes. Note both the inverter drive operation and the battery charging operation are featured by the bidirectional power flow capability.

Figure 5B:
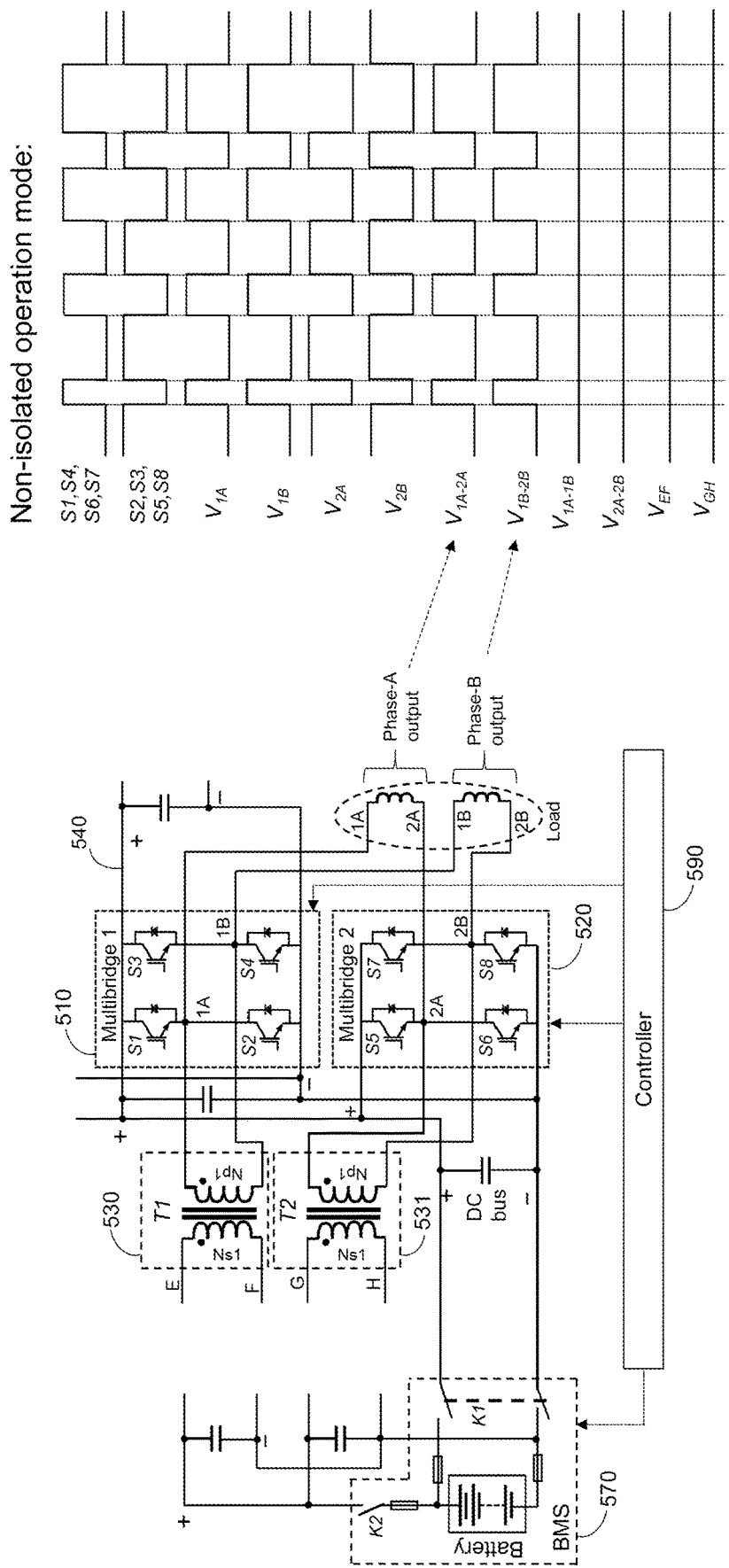
FIG. 5B illustrates the equivalent circuit of the circuit example shown in FIG. 5A in a non-isolated operation mode with example switching waveforms.

FIG. 5B illustrates the equivalent active circuit portion of the circuit shown in FIG. 5A in the non-isolated operation mode, together with example switching waveforms. In this non-isolated operation mode, the battery 570 supplies power to the DC bus with K1 closed, and the multibridges 510 and 520 provide a pair of single-phase outputs at the ports 1A and 2A and the ports 1 B and 2B, which are in parallel as single phase inverter outputs. As shown in the example switching waveforms, a phase-1A bridge and a phase-1 B bridge of the multibridge 510 are fully synchronized with the same gate timing signals; and also a phase-2A bridge and a phase-2B bridge of the multibridge 520 are fully synchronized with the same gate timing signals. Therefore, the phase-1 A bridge and the phase-1 B bridge generate identical PWM voltage waveforms across the primary winding of the transformer 530, therefore the secondary winding of the transformer 530 will have "0" voltage VEF at the ports E and F with no power flow under ideal conditions. The same thing is true with the transformer 531, of which the secondary winding will produce a flat voltage VGH staying at "0" at the ports G and H. Note in this non-isolated operation mode with non-perfect gate signal synchronization, the phase-1 A and phase-1 B bridges, as well as the phase-2A and phase-2B bridges, may not turn on or off at the same timing, and short voltage pulses or glitches may be seen at the secondary ports E and F of the transformer 530 and the secondary ports G and FI of the transformer 531. But the short voltage pulses can be tolerated due to the fact they will not deliver any significant portion of the total power flow.

Figure 5C:
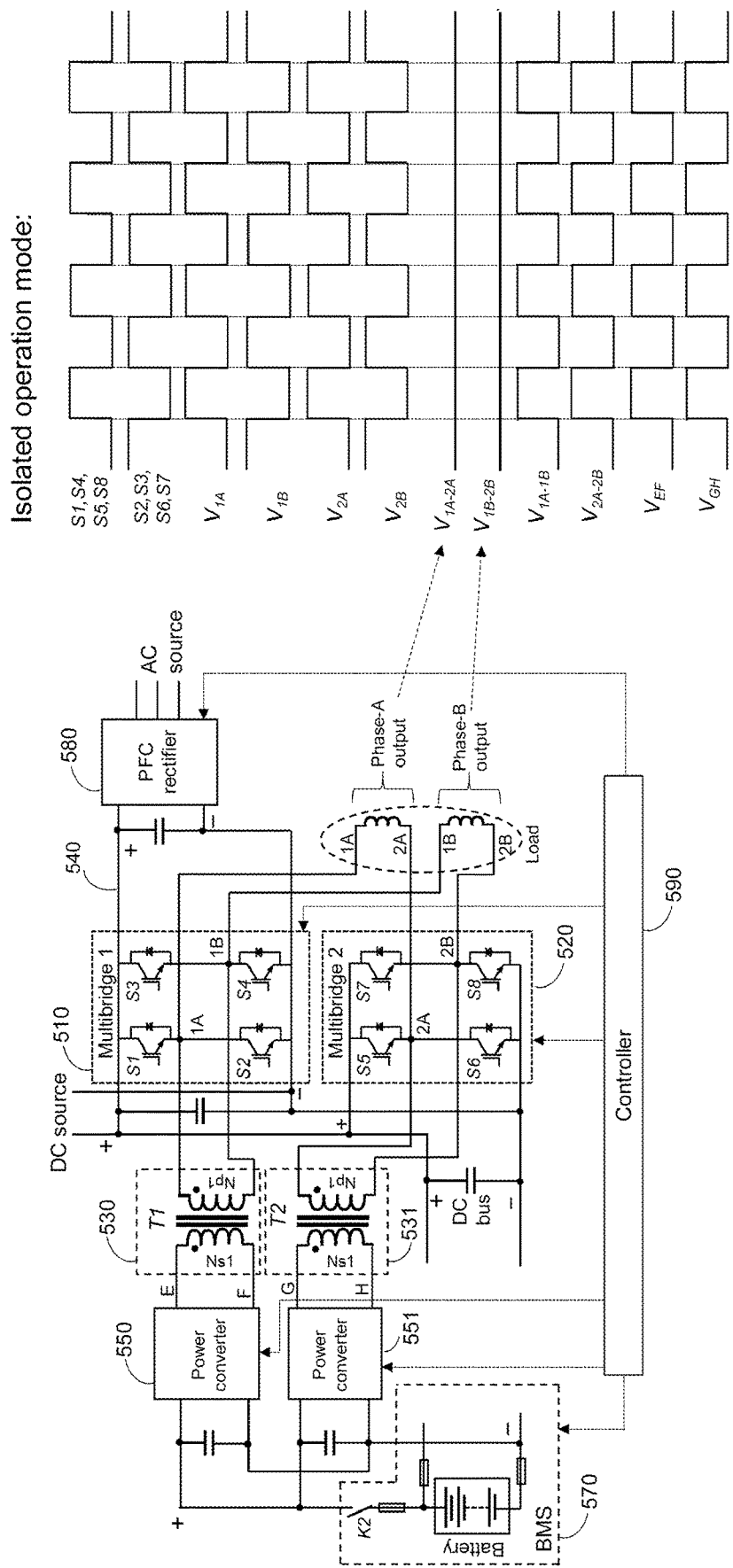
FIG. 5C illustrates the equivalent circuit of the circuit shown in FIG. 5A in an isolated operation mode with example switching waveforms.

FIG. 5C illustrates the equivalent active circuit portion of the circuit shown in FIG. 5A in the isolated operation mode with example switching waveforms. In this mode, the PFC rectifier 580 is actively working to support the DC bus by drawing power from the external AC source. Multibridges 510 and 520 are operate in opposite phase and thus the isolation transformers 530 and 531 are excited with square-shape voltage waveforms and power is delivered across the isolation transformers to charge up the battery 570. However, the non-isolated output ports 1 A and 2A or ports 1 B and 2B of the single-phase multibridge 510 or 520 will not have any significant power flow as shown in the example switching waveforms. The phase-1 A bridge of the multibridge 510 and the phase-2A bridge of the multibridge 520 are fully synchronized with the same gate timing signals, and so are the phase-1 B bridge of the multibridge 510 and the phase-2B bridge of the multibridge 520 fully synchronized. Therefore, the phase-1 A bridge and the phase-2A bridge generate identical PWM voltage waveforms and therefore result in "0" differential voltage across the non-isolated ports 1A and 2A. The same thing is true with the phase-1 B bridge and the phase-2B bridge which generate "0" differential voltage across the non-isolated ports 1 B and 2B. It is worth noting that in this isolated operation mode, the purpose is to minimize the power flow to the non-isolated ports 1A and 2A and ports 1 B and 2B, and to achieve that goal, some special arrangements may be needed with the load configurations connected to the non-isolated ports 1A and 2A and ports 1 B and 2B.

Figure 6A:
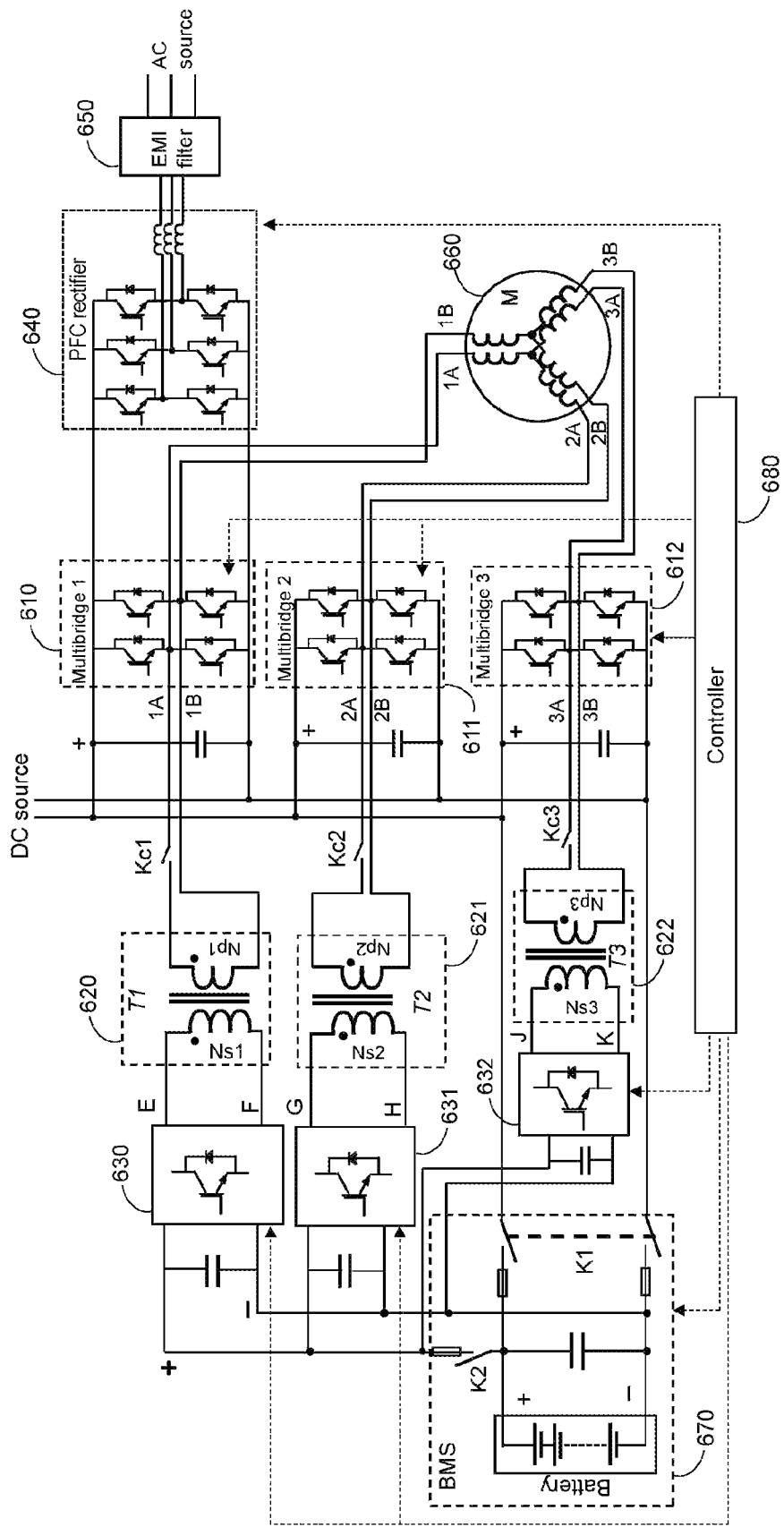
FIG. 6A illustrates a circuit example of multibridge converter-based three-phase inverter integrated with a battery charging system in accordance with various embodiments of the present disclosure.

FIG. 6A illustrates an example circuit diagram of a three-phase inverter system based on the multibridge converter in accordance with various embodiments of the present disclosure. There are three multibridge converters 610, 611, and 612 which are configured for driving a double winding AC motor 660, and coupled with three isolation transformers 620, 621, and 622 and their rectifiers 630, 631, 632 for charging the battery 670. A PFC rectifier 640 and an EMI filter 650 are connected between the DC bus and the external AC source. There is also a plug port for the external DC source for charging. With a controller 680, FIG. 6A shows an example of EV on-board integrated circuits that can perform functions of battery charging and inverter motor drives in an efficient manner. By sharing the main power components (i.e. the same multibridges 610, 611, 612 hardware), between the battery charging mode and the drive mode, component costs, sizes and weights of the circuit are reduced. Both the inverter drive operation and the battery charging operation are featured by the bidirectional power flow capability. Also, disconnect switches Kc1, Kc2 and Kc3 are connected in series with the primary windings of transformers T1, T2 and T3, respectively. And during non-isolated operation in parallel mode, these disconnect switches will allow the multibridge converter to operate in PWM phase interleaving to increase the effective switching frequency of the PWM voltages across the motor terminals. The benefits include reduced motor torque ripple and audible noise etc.

Figure 6C:
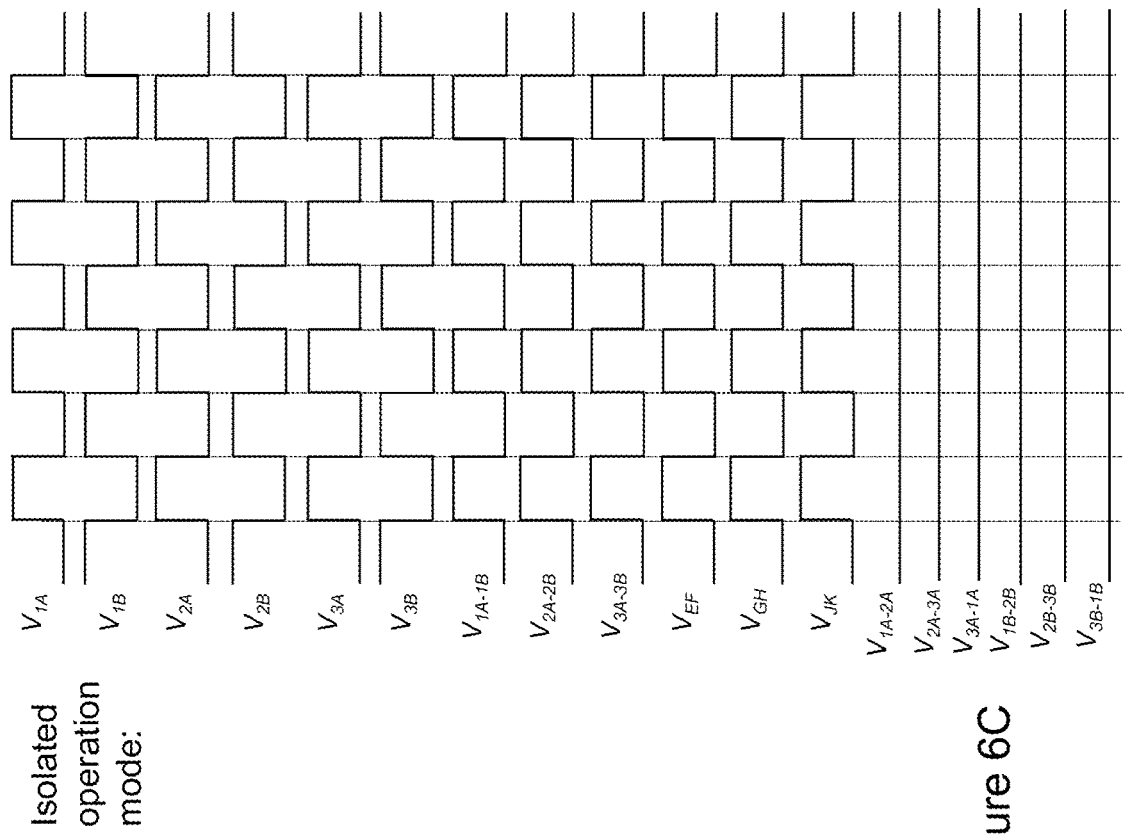
FIG. 6C illustrates an example of switching waveforms at an isolated operation mode of the circuit shown in FIG. 6A.
Figure 6B:
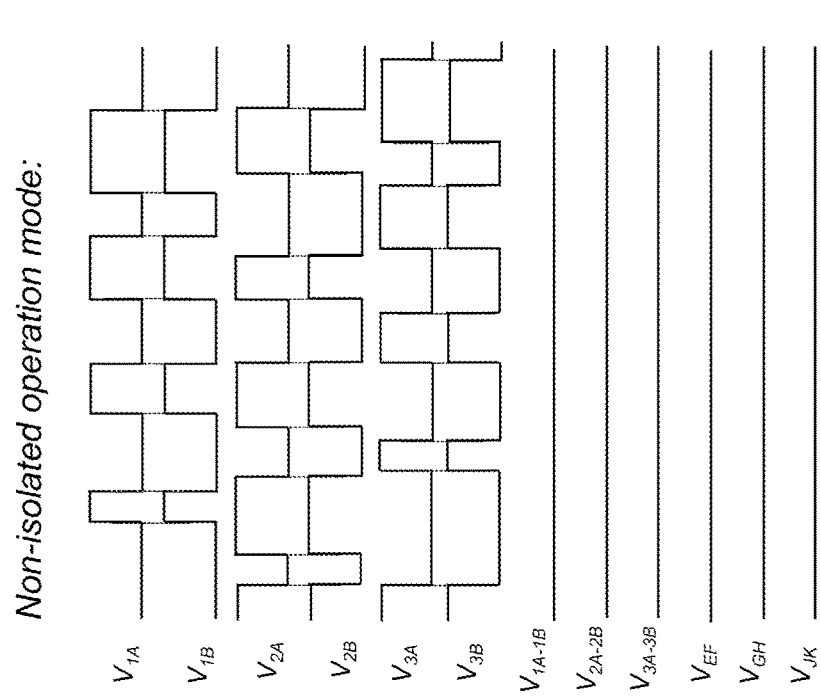
FIG. 6B illustrates an example of switching waveforms at a non-isolated operation mode of the circuit shown in FIG. 6A.

FIG. 6B illustrates an example of switching waveforms for a non-isolated operation mode of the three-phase inverter system based on the multibridge converter shown in FIG. 6A. In this non-isolated operation mode, i.e. a motor drive mode, a main contactor switch K1 for the battery is closed and the three multibridge converters 610, 611, 612 work together and function as a three-phase inverter, which is controlled by PWM or space-vector modulation (SVM) according to the motor speed and torque close-loop regulations in real time. Within each multibridge converter, the pair of two phase-bridges (e.g., 1A and 1 B, 2A and 2B, or 3A and 3B) are synchronized in phase and always gated on and off at the same timing so that the PWM output voltages (i.e., ViA=ViB, V2A=V2B, V3A=V3B) are identical in the same waveforms. Even without the disconnect switches (e.g., Kc1, Kc2, Kc3) there will be virtually "0" differential voltages applied across the three transformer primary windings. Therefore, as a result, the differential voltages across the secondary windings of the isolation transformers (namely, voltages VEF, VGH, and VJK) will also remain at "0". Therefore, battery power is mainly delivered to drive the motor through its double windings; and no significant power flow will be delivered across the three isolation transformers.

FIG. 6C illustrates an example of switching waveforms for an isolated operation mode of the three-phase inverter system based on the multibridge converter shown in FIG. 6A. In this isolated operation mode, i.e. a battery charging mode, the main contactor switch K1 for the battery stays open and the phase bridges of each multibridge converters 610, 611, or 612 are not switched on or off at the same timing. In fact, each multibridge operates like a standard LLC or phase-shift full-bridge converter and PWM regulation or frequency modulation is typically used to regulate the battery charging DC voltage and charging current. The charging power for the battery can be supplied by the PFC rectifier from the AC source, or by an external DC source.

Furthermore, there is another important thing to note here in FIG. 6C on the battery charging mode. The phase-A bridges of all three multibridge converters 610, 611 and 612 (i.e. the phase-1A bridge, the phase-2A bridge and the phase-3A bridge) are synchronized in phase, and the output voltages (namely, V1A=V2A=V3A) of these phase-A bridges are the same in PWM waveforms. So is true that output voltages (namely, VIB=V2B=AB) of the phase-B bridges of all three multibridge converters 610, 611 and 612 have the same waveforms. The result is that motor windings are not excited with any significant differential voltages that may cause circulating currents, especially with the two sets of motor double windings being separate from each other.

Figure 6D:
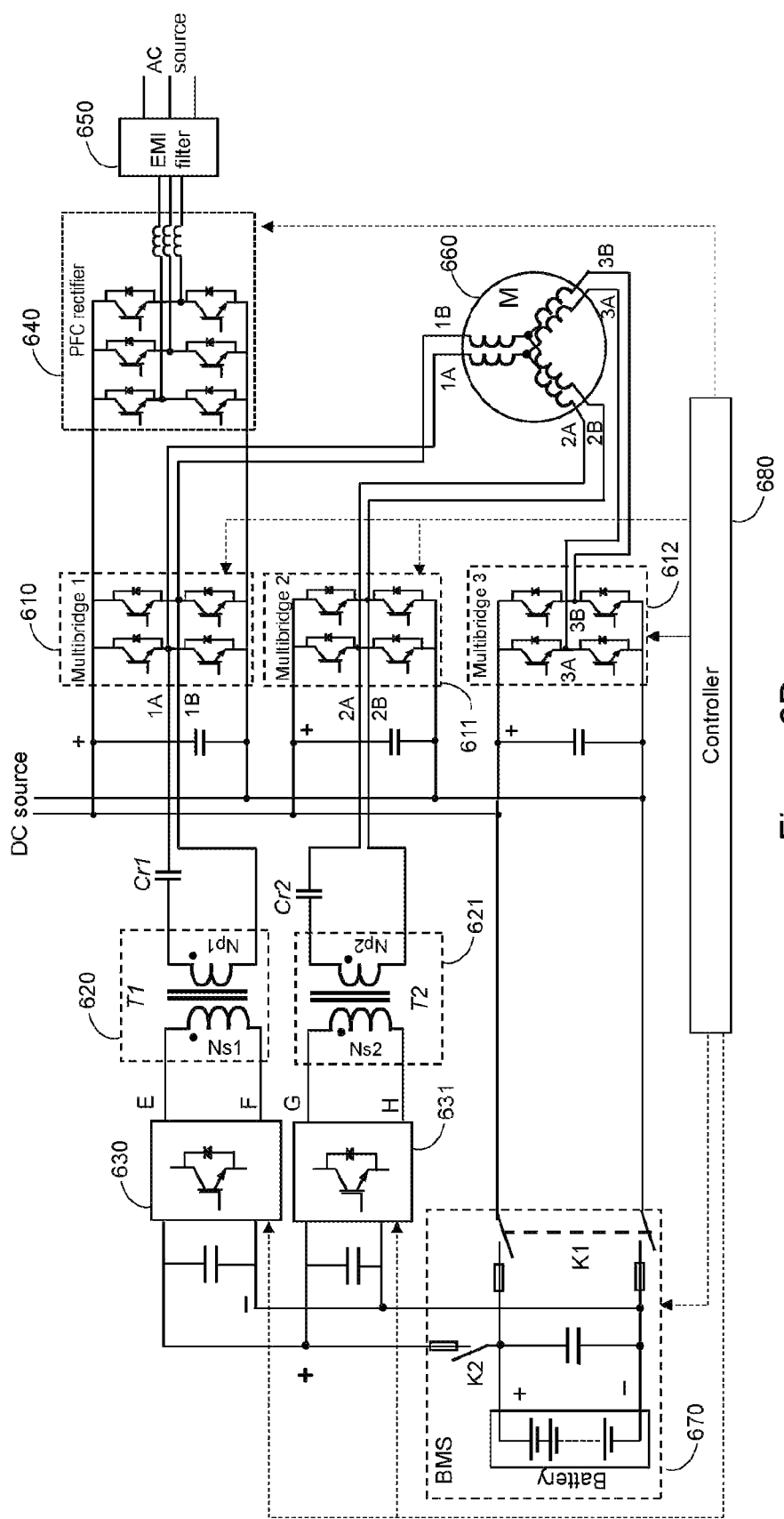
FIG. 6D illustrates another circuit example of multibridge converter-based three-phase inverter integrated with a battery charging system in accordance with various embodiments of the present disclosure.

FIG. 6D illustrates another embodiment of a three-phase multibridge inverter with two isolation transformers for a battery charging system. Here LLC converters with resonant capacitors Cr1 and Cr2 are explicitly shown in the circuit of the three-phase multibridge inverter. This circuit works in the same way as the three-transformer version in FIG. 6A, and the only difference therebetween is the reduced rating for battery charging power capacity. Both the inverter drive operation and the battery charging operation are featured by the bidirectional power flow capability.

Figure 6E:
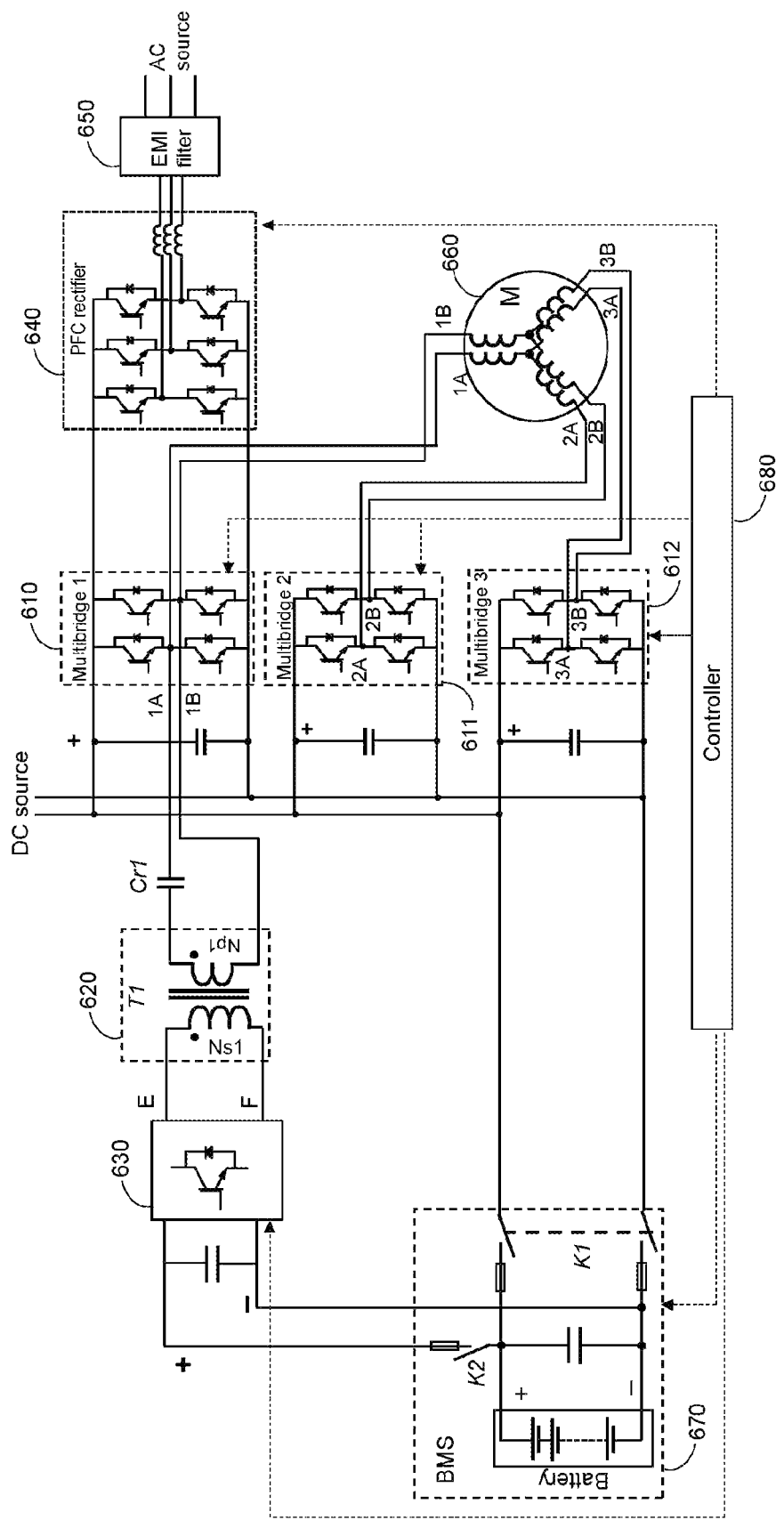
FIG. 6E illustrates another circuit example of multibridge converter-based three-phase inverter integrated with a battery charging system in accordance with various embodiments of the present disclosure.

FIG. 6E illustrates another embodiment of a three-phase multibridge inverter with one isolation transformer for a battery charging system. Here an LLC converter with a resonant capacitor Cr1 is explicitly shown in the circuit of the three-phase multibridge inverter. This circuit works in the same way as the three-transformer version in FIG. 6A or the two-transformer version in FIG. 6D, and the only difference therebetween is the further reduced rating for battery charging power capacity. Both the inverter drive operation and the battery charging operation are featured by the bidirectional power flow capability.

As pointed earlier, all the example circuits shown in this disclosure can be configured to be LLC resonant converter, although the resonant capacitors may not be explicitly shown in all the circuit drawings. In fact, throughout the examples in the present disclosure, the isolated DC-DC charging circuit is illustrated as a full-bridge phase-shift converter, an LLC converter, or a dual active bridge (DAB) converter. It should be understood that other isolated DC-DC topologies or a combination of different topologies are also applicable and may be well suitable for implementations of the multibridge converter circuit. And such modifications using other different topologies do not depart from the spirit and scope of the present disclosure as set forth in the appended claims.

Figure 7A:
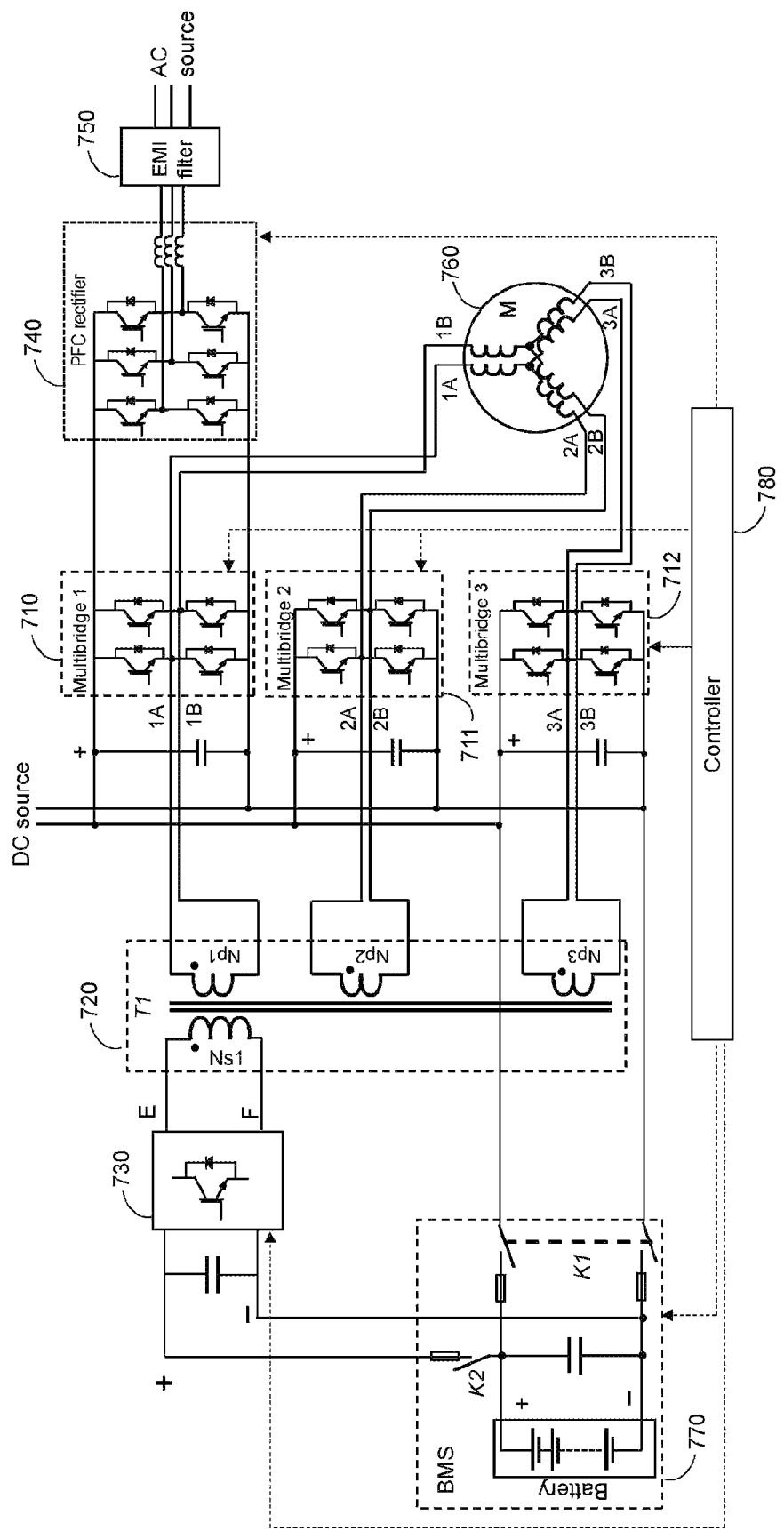
FIG. 7A illustrates another circuit example of multibridge converter-based three-phase inverter integrated with a battery charging system in accordance with various embodiments of the present disclosure.

FIG. 7A illustrates another embodiment of a three-phase multibridge inverter using one isolation transformer 720 with three coupled primary windings for a battery charging system. This circuit of the three-phase multibridge inverter works in the same way as the three-transformer version shown in FIG. 6A, and the only difference therebetween is on the design of the magnetic transformer. Alternatively, on the secondary winding of the isolation transformer 720, it is shown that a passive rectifier 730 can be used for battery charging, and the main benefit would be the lower cost compared to an active switching rectifier 630. Note both the inverter drive operation and the battery charging operation are featured by the bidirectional power flow capability.

Figure 7B:
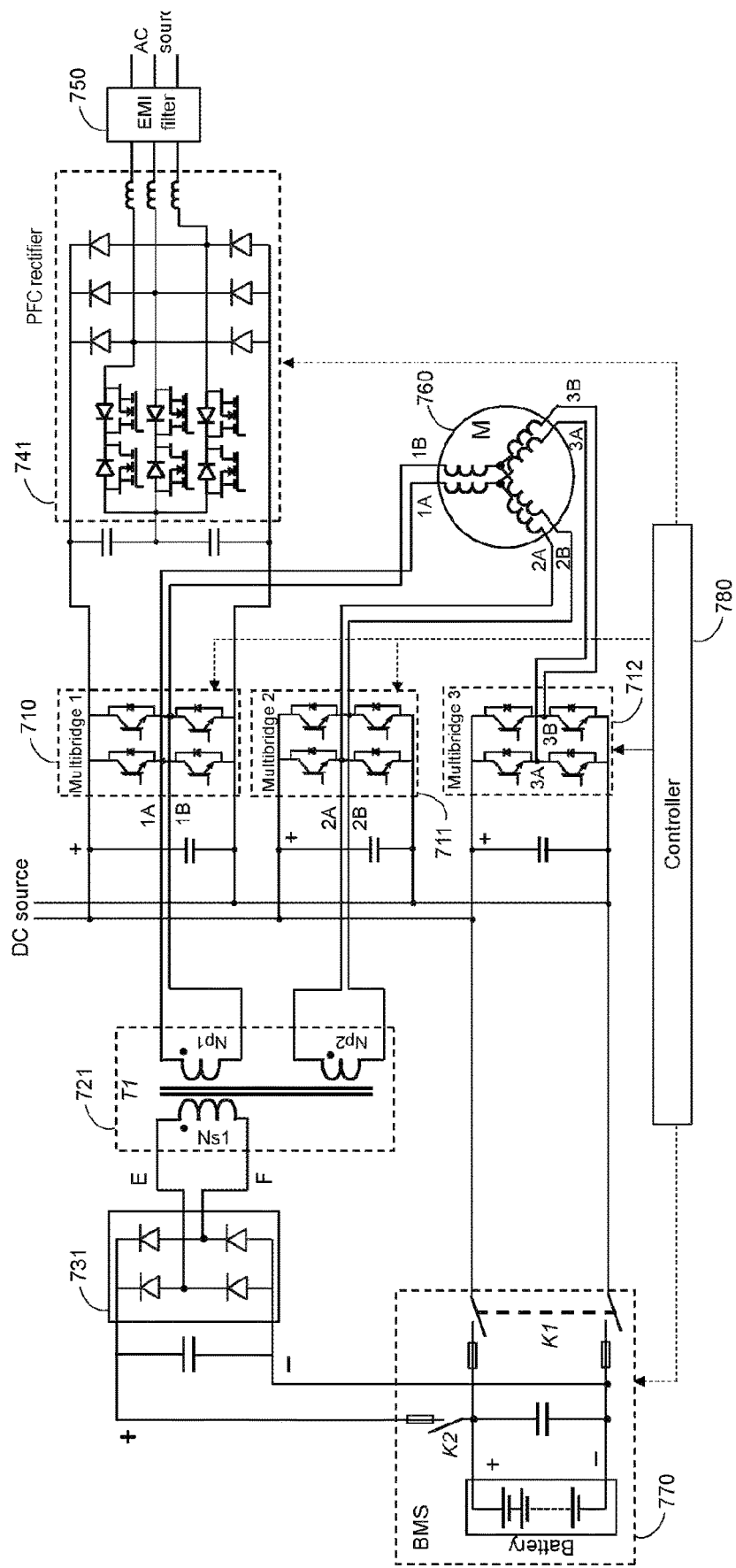
FIG. 7B illustrates another circuit example of multibridge converter-based three-phase inverter integrated with a battery charging system in accordance with various embodiments of the present disclosure.

FIG. 7B illustrates another embodiment of a three-phase multibridge inverter using one isolation transformer 721 with two coupled primary windings for a battery charging system. This circuit of the three-phase multibridge inverter works in the same way as the two-transformer version in FIG. 6D, and the only difference therebetween is on the design of the magnetic transformer. Alternatively, it is shown that a Vienna rectifier 741 is used for the Boost PFC converter to draw power from an external AC source, obtaining a benefit of the lower cost due to reduced voltage stress and current on the active switching devices.

Figure 8A:
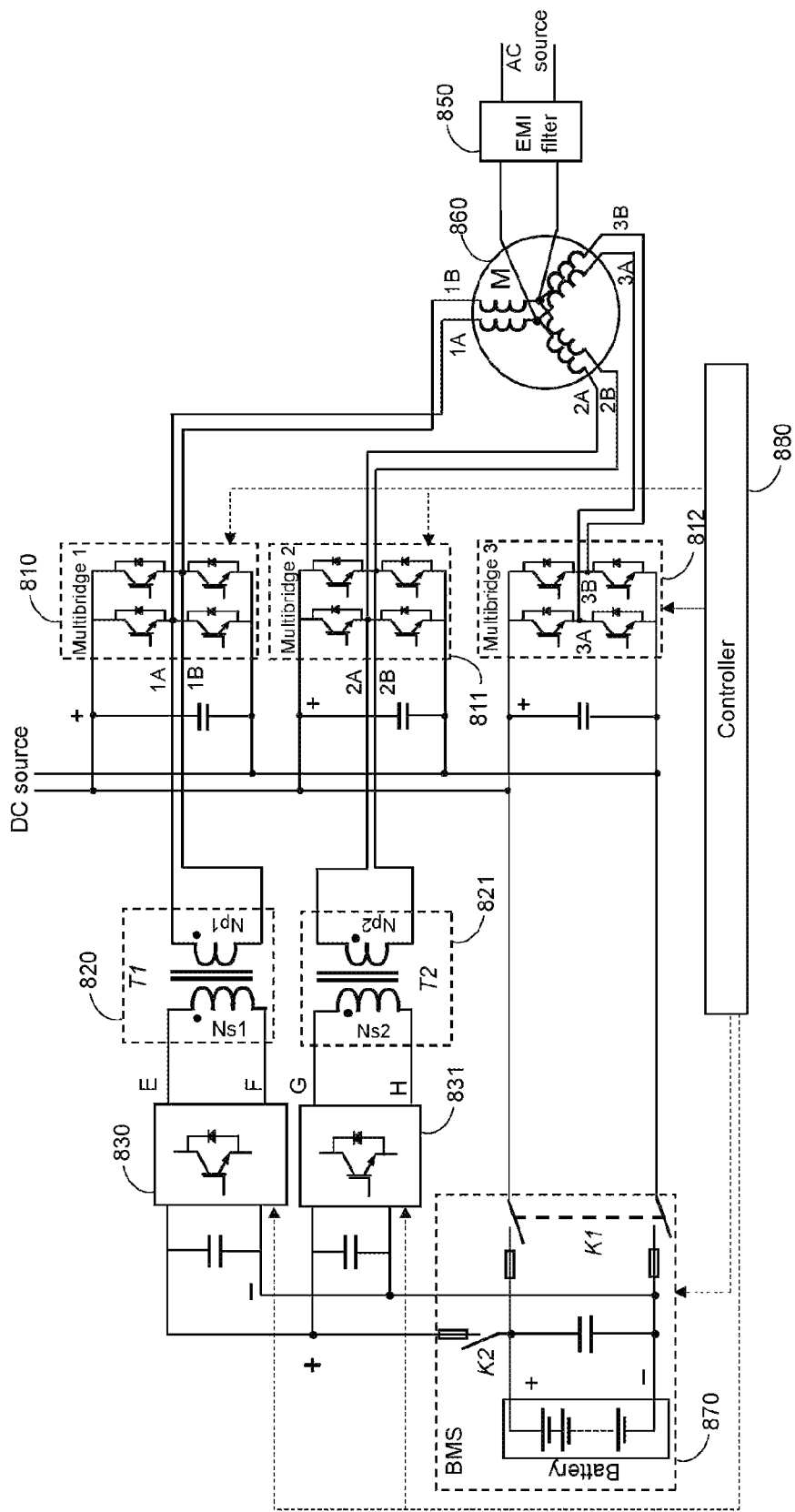
FIG. 8A illustrates another circuit example of multibridge-converter based three-phase inverter integrated with a battery charging system in accordance with various embodiments of the present disclosure.

FIG. 8A illustrates an embodiment of a three-phase multibridge inverter without additional PFC rectifier hardware. Instead, a phase bridge 812 is used as a Boost PFC rectifier operating in reverse power flow and winding inductance of a motor 860 is used as Boost inductors. This would further cut down the charging hardware cost. FIG. 8A shows two isolation transformers 820 and 821 and two rectifiers 830 and 831 for battery charging. A single-phase AC source is connected through an EMI filter 850 to the neutral points of the double windings of the EV motor 860. In an EV drive mode, the circuits shown in FIG. 8A work in the same way as previously described, and within each multibridge the two phase bridges operate in parallel mode. The difference is on the battery charging mode due to the fact there is no additional PFC rectifier. During battery charging in the isolated operation mode, within each multibridge the two phase bridges operate in a full bridge mode. In addition, the PWM duty cycles of each multibridge in full bridge mode still need to be modulated by the AC voltage reference waveform for power factor correction functions. This is basically the same way how congenital single-stage PFC-enable isolated DC-DC converter works. And the drawback is that the isolated transformer magnetic core size will be bigger due to the AC current envelop riding on top of PWM switching ripples. When the phase bridges 810, 811, 812 operate as a PFC rectifier to draw current through motor windings, they need to coordinate together in terms of PWM gate timing synchronization in order to minimize the motor winding circulating currents. Caution is also needed in the control design to reduce the motor pulsating torque and not to allow the rotor to move during charging. Note both the inverter drive operation and the battery charging operation are featured by the bidirectional power flow capability.

Figure 8B:
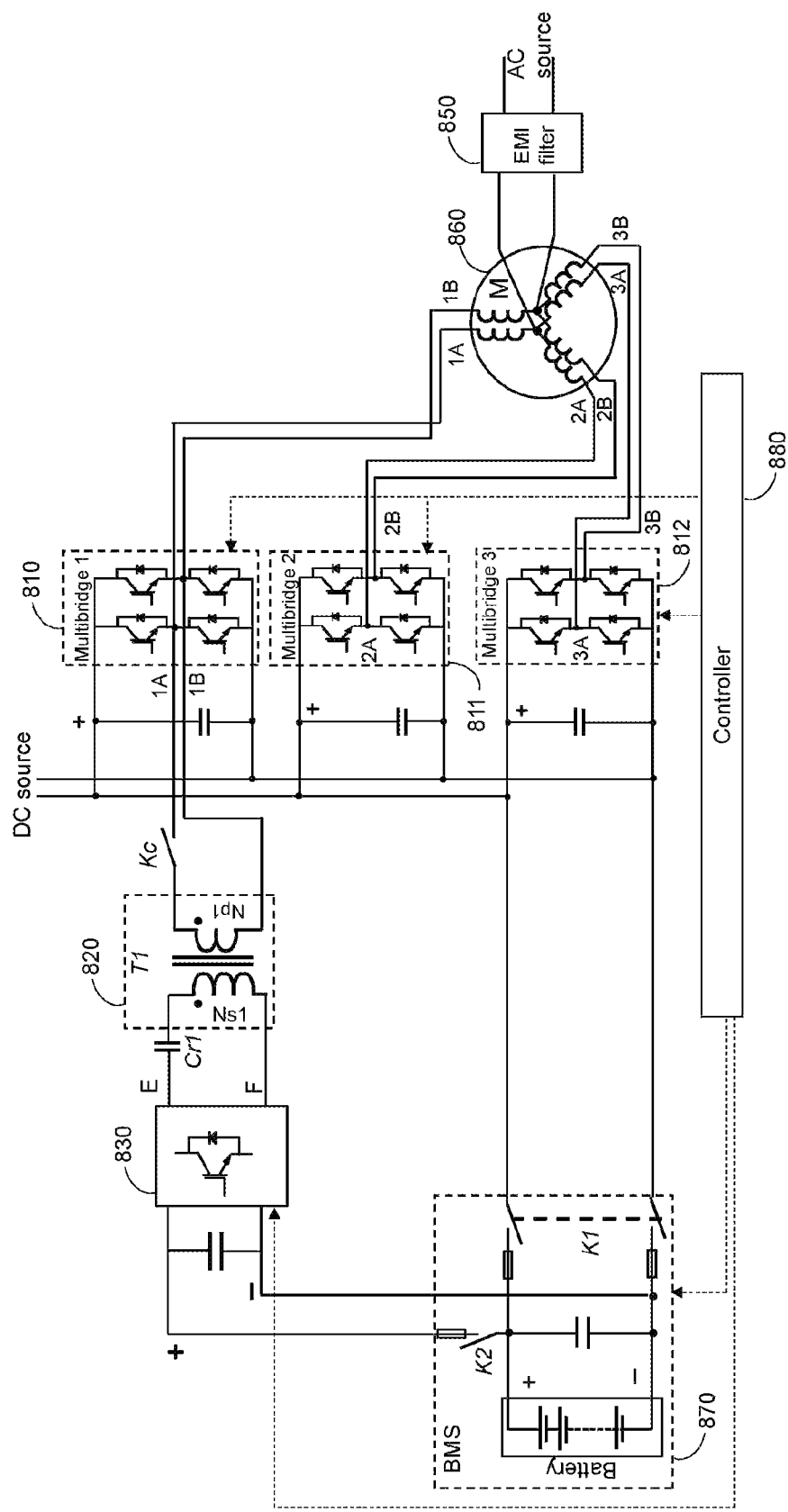
FIG. 8B illustrates another circuit example of multibridge converter-based three-phase inverter integrated with a battery charging system in accordance with various embodiments of the present disclosure.

FIG. 8B illustrates another embodiment of a three-phase multibridge inverter without additional PFC rectifier hardware. Similarly, phase bridges 810, 811 and 812 are used as Boost PFC rectifiers operating in reverse power flow and winding inductance of a motor 860 is used as Boost inductors. An AC source is connected through an EMI filter 850 to the two neutral points of the dual windings of the motor 860. FIG. 8B shows one isolation transformer 820 for a battery charging system. During battery charging in the isolation mode, the phase bridges 810, 811 and 812 operate as single-stage PFC-enable DC-DC converter, the same way as in FIG. 8A. Also the gate timing controls for the phase bridges 810, 811 and 812 need to be synchronized in phase to minimize the motor winding circulating currents. Caution is also needed in the control design to reduce the motor pulsating torque and not to allow the rotor to move during charging. Other than that, this circuit of the three-phase multibridge inverter basically works in the same way as that in FIG. 8A. Note both the inverter drive operation and the battery charging operation are featured by the bidirectional power flow capability.

Figure 8C:
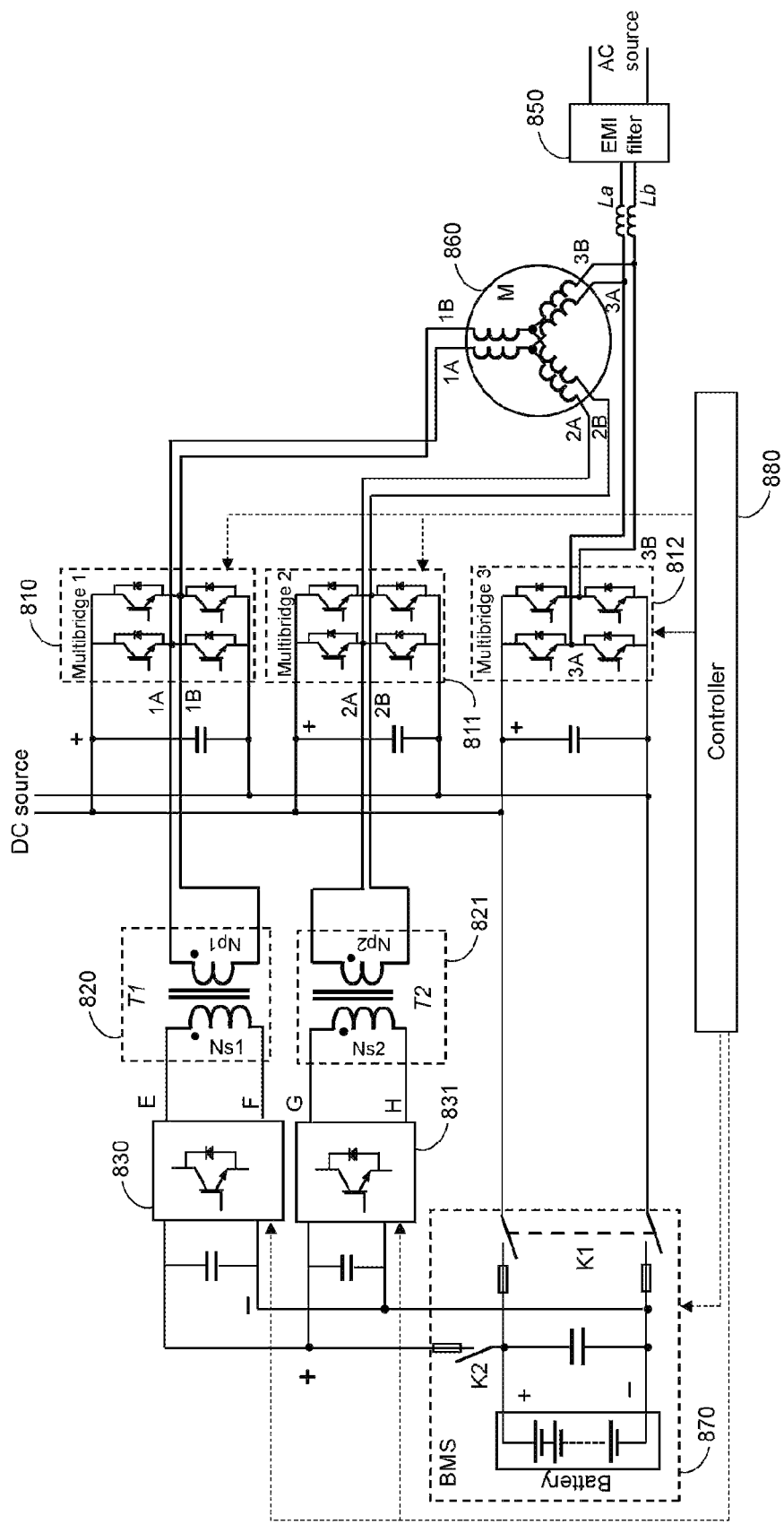
FIG. 8C illustrates another circuit example of multibridge converter-based three-phase inverter integrated with a battery charging system in accordance with various embodiments of the present disclosure.

FIG. 8C illustrates an embodiment of a three-phase multibridge inverter with two isolation transformers 820 and 821 used for charging. Again there is no additional PFC rectifier hardware used here. Instead, a phase bridge 812 is used as a Boost PFC rectifier operating in reverse power flow and two inductors La and Lb are used as Boost inductors. Three multibridge converters formed by the phase bridges 810, 811 and 812 are used for driving a double winding motor 860; and two isolation transformers 820 and 821 and two rectifiers 830 and 831 are used for charging the battery 870. A single-phase AC source is connected through an EMI filter 850 to the double winding terminals 3A and 3B of the EV motor 860 through the inductors La, Lb. In the EV drive mode, the circuits shown in FIG. 8C work in the same way as previously described. During battery charging in the isolated operation mode, the phase bridge 812 operates as a PFC rectifier to draw current from the external AC source, and the other phase bridges 810 and 811 need to coordinate with the phase bridge 812 in terms of PWM gate timing in order to minimize the winding circulating currents of the motor 860. Ideally with gate timing synchronized among three multibridges, PWM output voltage at port 1A, 2A, and 3A will be the same and motor 860 phase-A winding will not have any circulating current. Similarly, PWM output voltage at 1B, 2B, and 3B will be the same and thus the phase-B winding of motor 860 will not have any circulating current. Therefore the rotor of the motor 860 will not move during battery charging. Note both the inverter drive operation and the battery charging operation are featured by the bidirectional power flow capability.

Figure 8D:
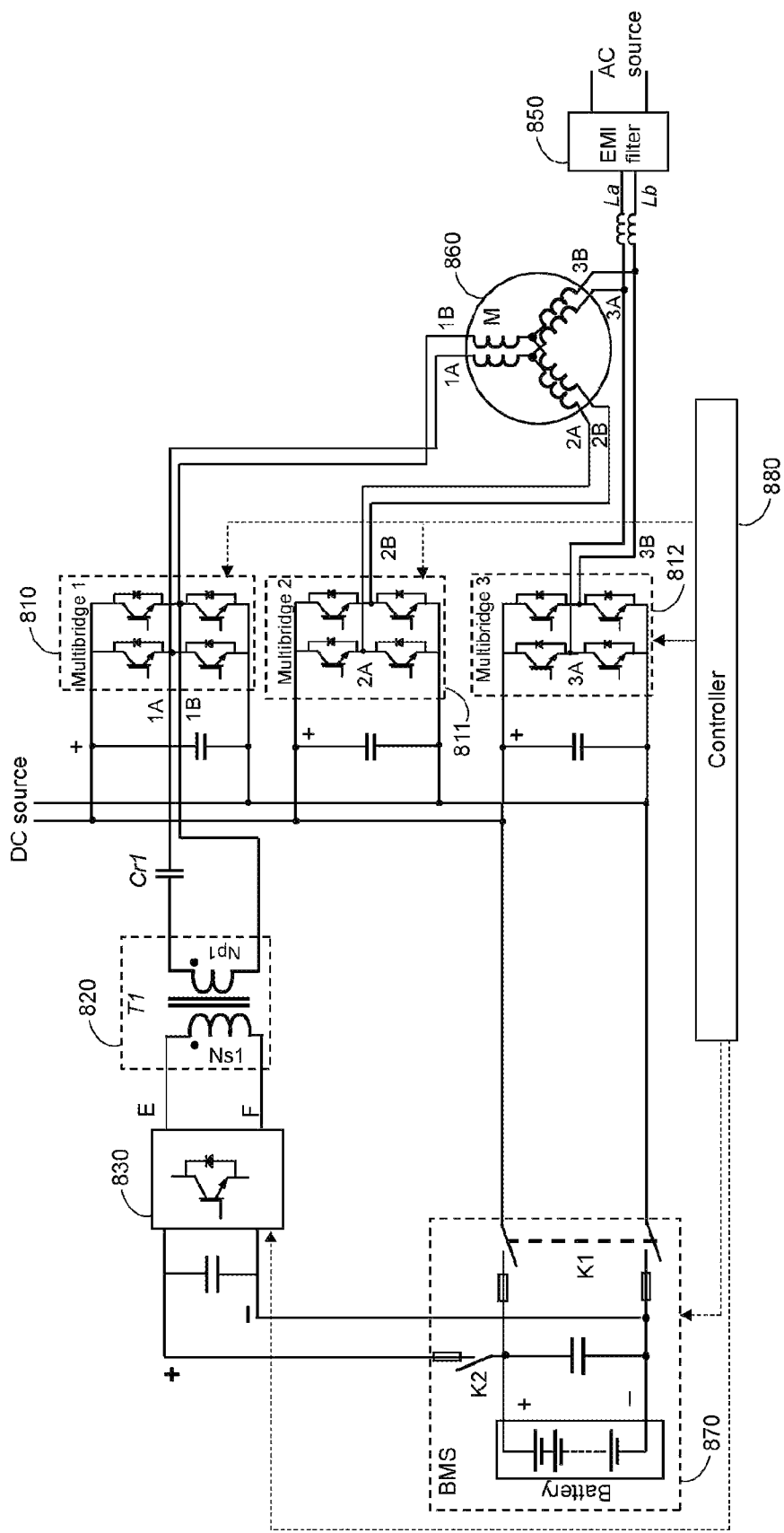
FIG. 8D illustrates another circuit example of multibridge converter-based three-phase inverter integrated with a battery charging system in accordance with various embodiments of the present disclosure.

FIG. 8D illustrates another embodiment of a three-phase multibridge inverter with one isolation transformer 820 used for charging. Similarly, there is no additional PFC rectifier hardware used here. Instead, phase bridge 812 are used as Boost PFC rectifiers operating in reverse power flow and two inductors La and Lb are used as Boost inductors. For the same reason, PWM gate timing of all three multibridges are synchronized and the same PWM output voltage are generate across motor 860 phase A windings (namely, port 1A, 2A, 3A) and across phase B winding (namely, port 1B, 2B, 3B). Although AC voltages are applied across winding terminals 3A and 3B of the motor 860, no circulating current through the windings of the motor 860 is excited and therefore the rotor of the motor 860 will not move during battery charging. During battery charging in the isolation mode, while the phase bridge 812 operates as PFC rectifiers, the PWM gate timing for the phase bridges 810, 811 and 812 need to be synchronized in phase to minimize the motor winding circulating currents so that motor will not move during charging. Note both the inverter drive operation and the battery charging operation are featured by the bidirectional power flow capability.

Figure 9A:
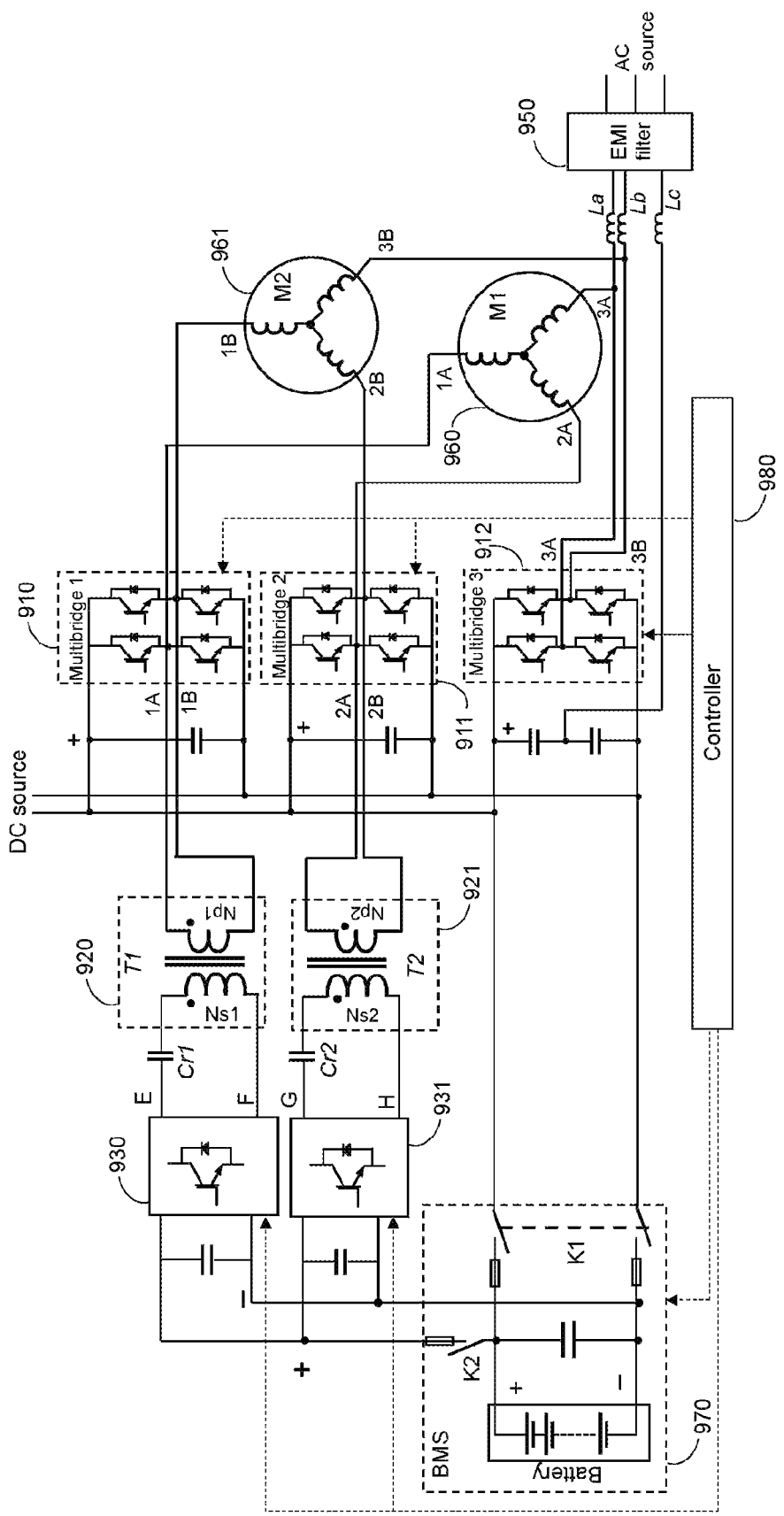
FIG. 9A illustrates another circuit example of multibridge converter-based three-phase inverter driving two motors integrated with a battery charging system in accordance with various embodiments of the present disclosure.

FIG. 9A illustrates an embodiment of a three-phase multibridge inverter driving two Ac motors 960 and 961. There is no additional PFC rectifier hardware used here. Instead, a phase bridge 912 is used as a Boost PFC rectifier operating in reverse power flow and two inductors La and Lb are used as Boost inductors. There are two isolation transformers 920 and 921 and two rectifiers 930 and 931 for charging the battery 970. A single-phase AC source is connected through an EMI filter 950 to winding terminals 3A and 3B of the motors 960 and 961 through the inductors La and Lb. Another inductor Lc is connected to the middle point of the DC bus to form a third line of the AC input, either as three-phase AC or split single-phase AC. In the EV drive mode, the circuits shown in FIG. 9A work in the same way as previously described. During battery charging in the isolated operation mode, the phase bridge 912 mainly operates as a PFC rectifier to draw current from the external AC source, and the other phase bridges 910 and 911 need to coordinate with the phase bridge 912 in terms of PWM gate timing synchronization in order to minimize the circulating currents through the windings of the motors 960 and 961. Here again although AC voltage is applied across winding terminals 3A and 3B of the motors 960 and 961, no circulating current through the windings of the motors 960 and 961 is excited and therefore the rotors of the motors 960 and 961 will not move during battery charging. Note both the inverter drive operation and the battery charging operation are featured by the bidirectional power flow capability.

Figure 9B:
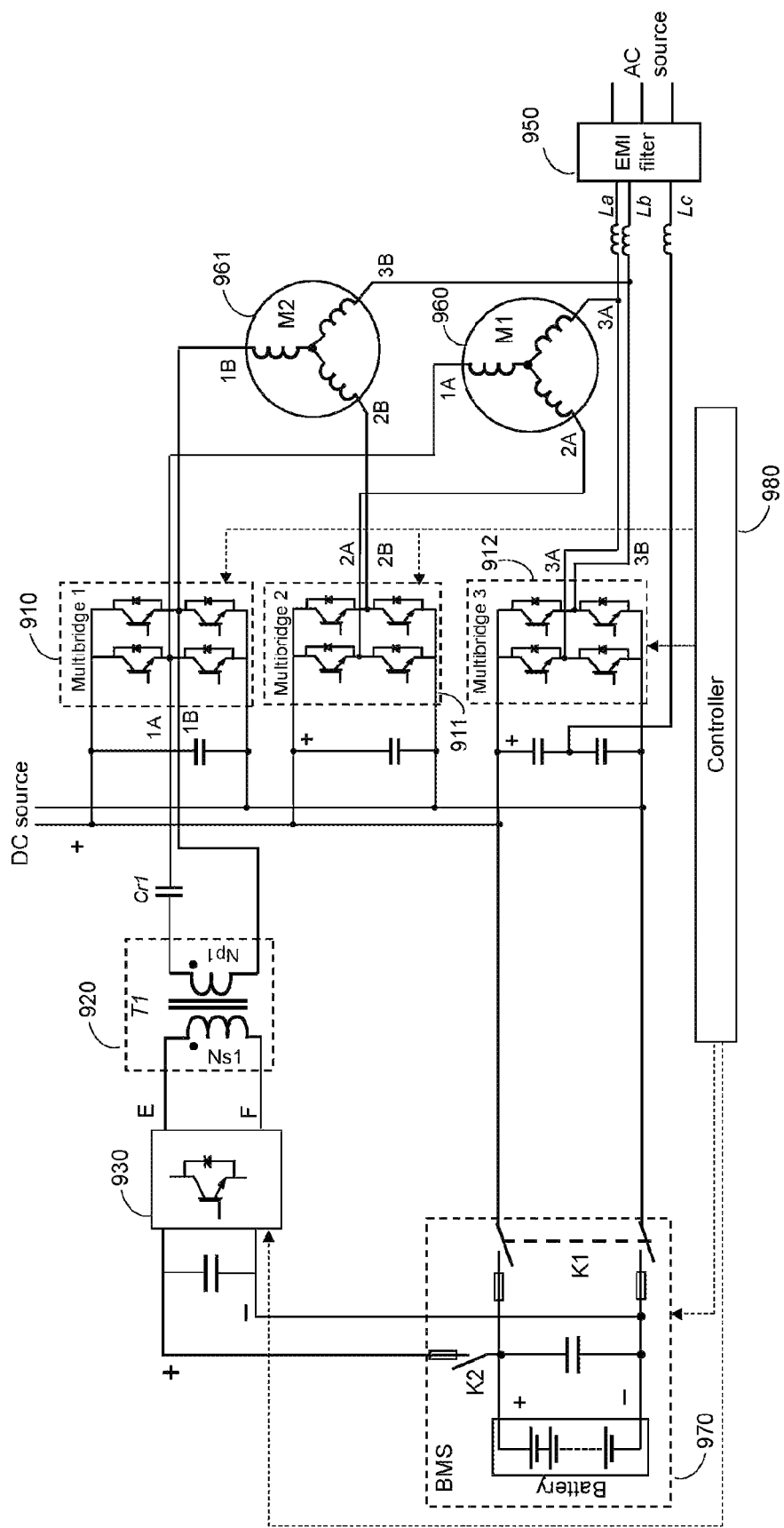
FIG. 9B illustrates another circuit example of multibridge converter-based three-phase inverter driving two motors integrated with a battery charging system in accordance with various embodiments of the present disclosure.

FIG. 9B illustrates another embodiment of a three-phase multibridge inverter driving two AC motors 960 and 961, with one isolation transformer 920 used for battery charging. Similarly, there is no additional PFC rectifier hardware used here. Instead, a phase bridge 912 is used as a Boost PFC rectifier operating in reverse power flow and two inductors La and Lb are used as Boost inductors. Another inductor Lc is connected to the middle point of the DC bus to form a third line of the AC input, either as three-phase AC or split single-phase AC. For the same reason, although AC voltages are applied across winding terminals 3A and 3B of the motors 960 and 961, no circulating current through the windings of the motors 960 and 961 is excited and therefore the motors 960 and 961 will not move during battery charging. Caution is needed in the design to coordinate the gate timing controls of the phase bridges 910, 911 and 912 in order to minimize any high-frequency part of circulating current through the windings of the motors 960 and 961. Note both the inverter drive operation and the battery charging operation are featured by the bidirectional power flow capability.

Figure 10A:
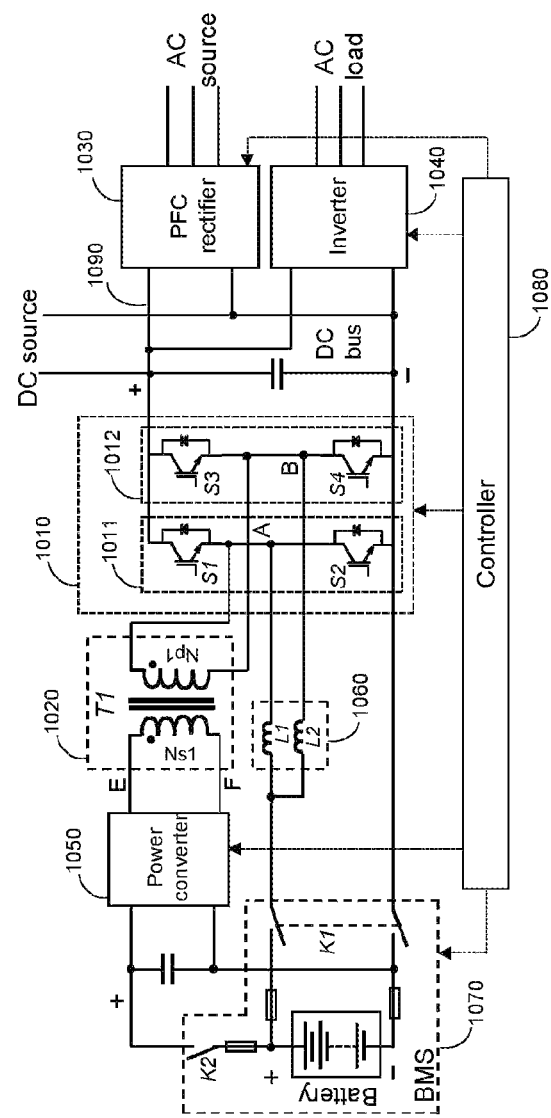
FIG. 10A illustrates a circuit example of multibridge converter-based DC-to-DC boost converter integrated with a battery charging system in accordance with various embodiments of the present disclosure.

FIG. 10A illustrates an example circuit of a multibridge-based DC-DC boost converter and a battery charging system in accordance with various embodiments of the present disclosure. A multibridge 1010 having two phase bridges 1011 and 1012 is shown as a boost converter that converts the DC voltage of a battery 1070 to a higher voltage for the DC Bus to drive an inverter 1040 to support an AC load (for example, an AC motor load for EV tractions). Two Boost inductors 1060, namely L1 and L2, are connected between the main contactor K1 for the battery 1070 and non-isolated output ports A and B of the phase bridges 1011 and 1012, respectively. The inductors 1060 can also be coupled inductors. A bidirectional PFC rectifier 1030 is provided to draw current from an external AC source to supply the DC bus while charging. The primary winning of an isolation transformer 1020 is connected across the output ports A and B of the multibridge 1010. At the output formed by the ports E and F of the secondary winding of the transformer 1020, a bidirectional power converter 1050 is used to regulate an AC voltage from the transformer 1020 to a DC voltage and charge up the battery 1070. Note both the inverter operation mode and the battery charging mode are featured by the bidirectional power flow capability.

Figure 10B:
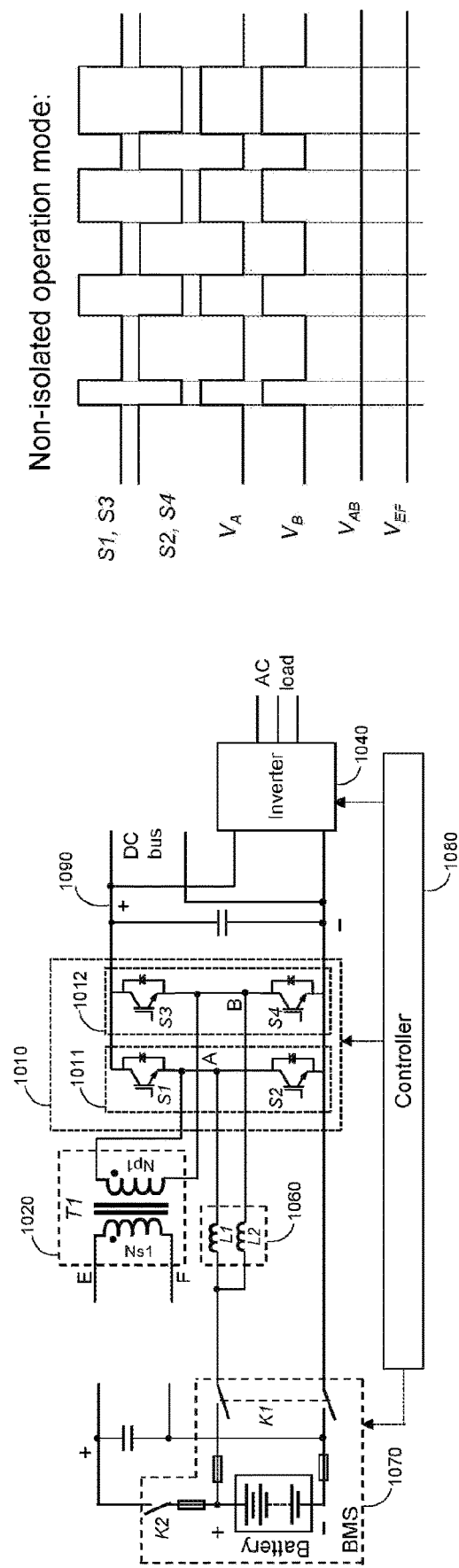
FIG. 10B illustrates the equivalent circuit of the circuit shown in FIG. 10A in a non-isolated operation mode with example switching waveforms.

FIG. 10B illustrates the equivalent active switching circuit of the circuit shown in FIG. 10A in a non-isolated operation mode with example switching waveforms. During an inverter operation in the non-isolated mode, the battery contactor K1 is closed and the external source is disconnected, the multibridge 1010 works as a DC-DC boost converter. Phase bridges 1011 and 1012 of the multibridge 1010 are operated in a parallel mode with their PWM gate switching signals synchronized in phase. Therefore, the same PWM voltage waveforms are generated across the primary winding of an isolation transformer 1020, and the transformer winding is not excited with any significant differential voltages. So that power flow is mainly delivered to the inverter 1040 and further to the AC load, but not much power flow across the isolation transformer 1020 except for some transformer core losses. Also short pulses or voltage glitches may be seen at the secondary ports E and F of the transformer, but those short pulses can be tolerated due to the fact they will not deliver any significant portion of the total power flow.

Figure 10C:
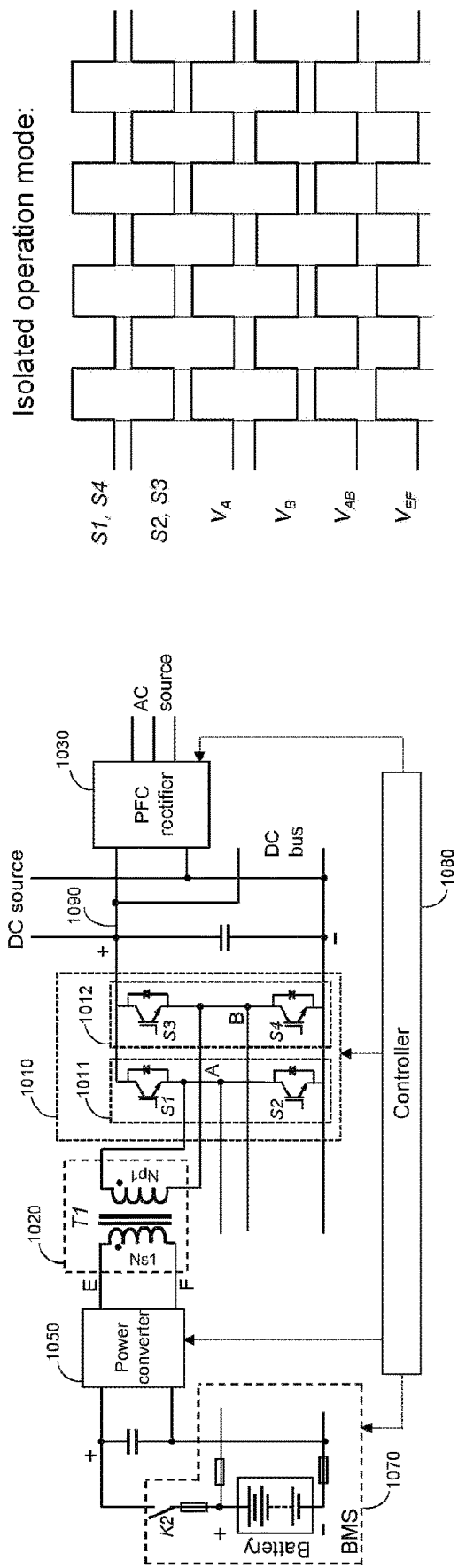
FIG. 10C illustrates the equivalent circuit of the circuit shown in FIG. 10A in an isolated operation mode with example switching waveforms.

FIG. 10C illustrates the equivalent active switching circuit of FIG. 10A in an isolated operation mode with example switching waveforms. During a battery charging operation in the isolated mode, the battery contactor kl is open and the external AC or DC source is connected, the two phase bridges 1011 and 1012 of the multibridge 1010 are operated in a full bridge mode. The PWM gate switching signals are phase shifted and out of phase between the two bridges. In fact, the two bridges 1011 and 1012 can be regulated as a normal LLC or DAB converter with PWM regulation, frequency modulation or phase-shift control, so that power from the AC source is mainly delivered to the isolated output (i.e. the isolated ports E and F) through the transformer 1020.

FIG. 10D illustrates a modified example circuit with an additional switch being added to the circuit shown in FIG. 10A. Particularly, FIG. 10D shows the revised equivalent active switching circuit in a non-isolated operation mode along with example switching waveforms. The circuit in FIG. 10D merely differs from that in FIG. 10A in that a transformer disconnect switch, namely Kc, is connected between an output of the multibridge 1010 and a winding terminal of the transformer 1020. With the help of this disconnect switch Kc, the purpose is to introduce a phase shift angle in the synchronized PWM signals and achieve the interleaved operation between the switching bridges 1011 and 1012 during the non-isolated operation mode. This disconnect switch Kc can be anything like contactor, relay, or semiconductor device switches. Also, this disconnect switch Kc can be in series with the transformer either on the side of the primary winding as shown in FIG. 10D or on the side of the secondary winding (not shown). Parallel bridge interleaving is well known for the benefit of increasing the effective PWM frequency across the load, therefore reducing the load voltage and current ripple and potentially mitigating electromagnetic emissions (EMI) and audible noises.

Figure 11A:
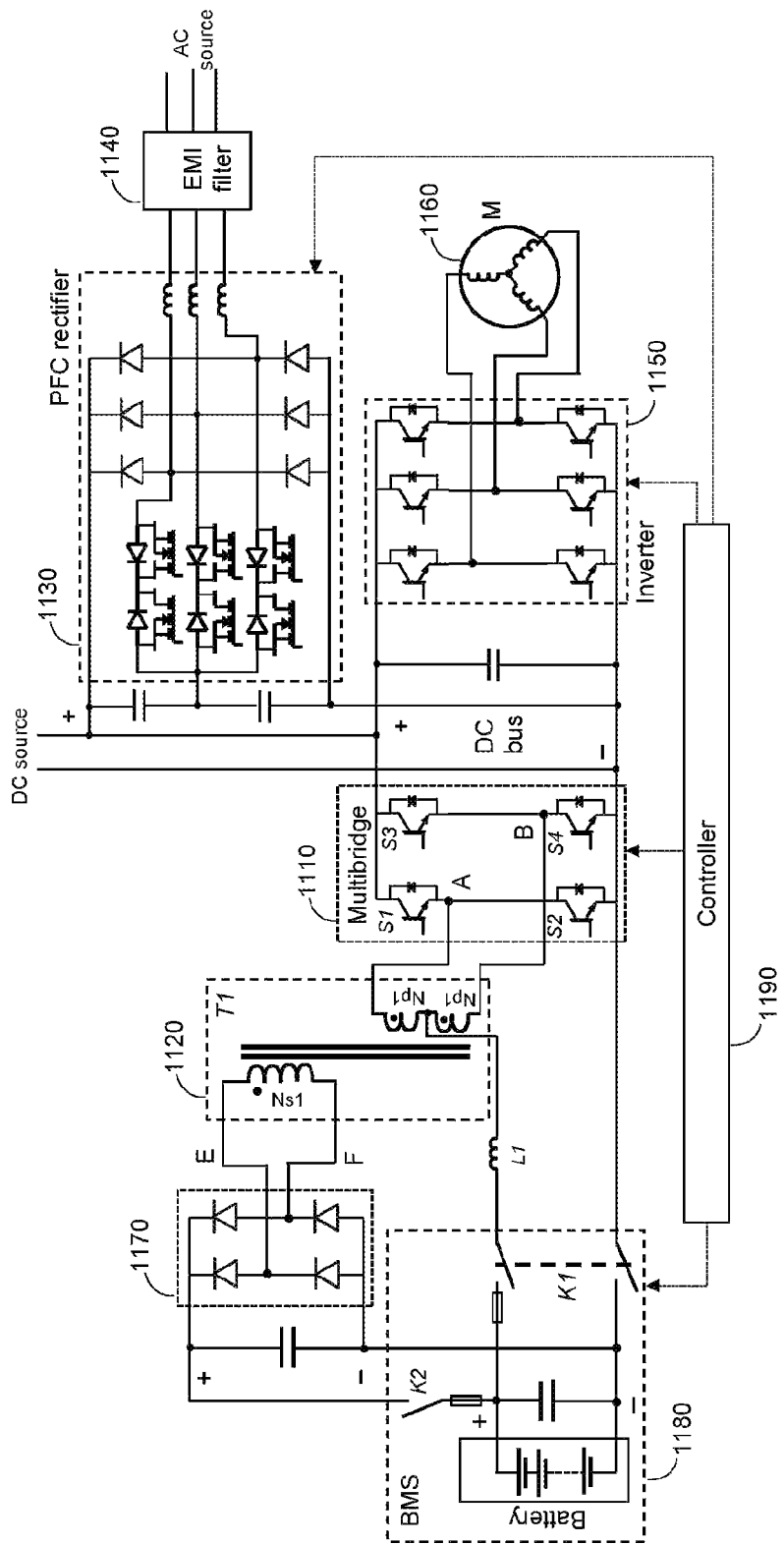
FIG. 11A illustrates another circuit example of multibridge converter-based DC-to-DC boost converter integrated with a battery charging system in accordance with various embodiments of the present disclosure.

FIG. 11A illustrates another example circuit of a multibridge-based DC-to-DC boost converter and a battery charging system in accordance with various embodiments of the present disclosure. Unlike the previous circuit shown in FIG. 10A, here a battery 1180, a main DC contactor K1, an inductor L1, and the mid-point of the primary winding of an isolation transformer 1120 are connected in series. During an EV drive operation in the non-isolated operation mode, the primary winding of the transformer 1120 is used as a coupled Boost inductor. When the inductance of the transformer 1120 is properly design, the inductor L1 may not be needed or it can be indicated as parasitic inductance of wirings and cabling, etc.

FIG. 11 B illustrates the equivalent active switching circuit of the circuit shown in FIG. 11A in the non-isolated operation mode with example switching waveforms. During an inverter operation in the non-isolated operation mode, the contactor K1 is closed and the external source is disconnected, multibridge 1110 operates as a DC-DC boost converter. Similarly to the case in FIG. 10B, the two phase bridges are operated in a parallel mode and their gate switching signals synchronized in phase. Therefore the same PWM voltage waveforms are generated across the primary winding of the transformer 1120, and the transformer winding is not excited with any significant differential voltages. So that power flow is mainly delivered to the inverter 1150 and further to the AC load (e.g. an AC motor 1160 as shown), but not much across the isolation transformer 1120 except for the transformer core loss and other parasitic losses.

FIG. 11 C illustrates the equivalent active switching circuit of FIG. 11A in an isolated operation mode with example switching waveforms. During a battery charging operation in the isolated mode, the contactor kl is open and the external AC or DC source is connected. Similarly to the case in FIG. 10C, the two phase bridges of the multibridge 1110 are operated in full bridge mode and the PWM switching signals are phase shifted and out of phase between the two bridges. In fact, the two phase bridges can be operated as a normal LLC or DAB converter with PWM regulation, frequency modulation, or phase-shift control, so that power is transferred between the DC bus and the isolated outputs (i.e. the isolated ports E and F) through the transformer 1120.

FIG. 11 D illustrates a modified example circuit with an additional switch being added to the circuit shown in FIG. 11 A. Particularly, FIG. 11 D shows the revised equivalent active switching circuit in a non-isolated operation mode along with example switching waveforms. The circuit in FIG. 11 D merely differs from that in FIG. 11 A in that a transformer disconnect switch, namely Kc, is connected to an output terminal of the secondary winding of the transformer 1120. With the help of this disconnect switch Kc, the purpose is to introduce a phase shift angle in the synchronized PWM signals and achieve the interleaved operation between the two phase bridges during the non-isolated Boost mode. This disconnect switch Kc can be anything like contactor, relay, or semiconductor device switches. Parallel bridge interleaving is well known for the benefit of increasing the effective PWM frequency on the load, therefore reducing the load current and voltage ripple, and potentially mitigating electromagnetic emissions (EMI) and audible noises.

Figure 12:
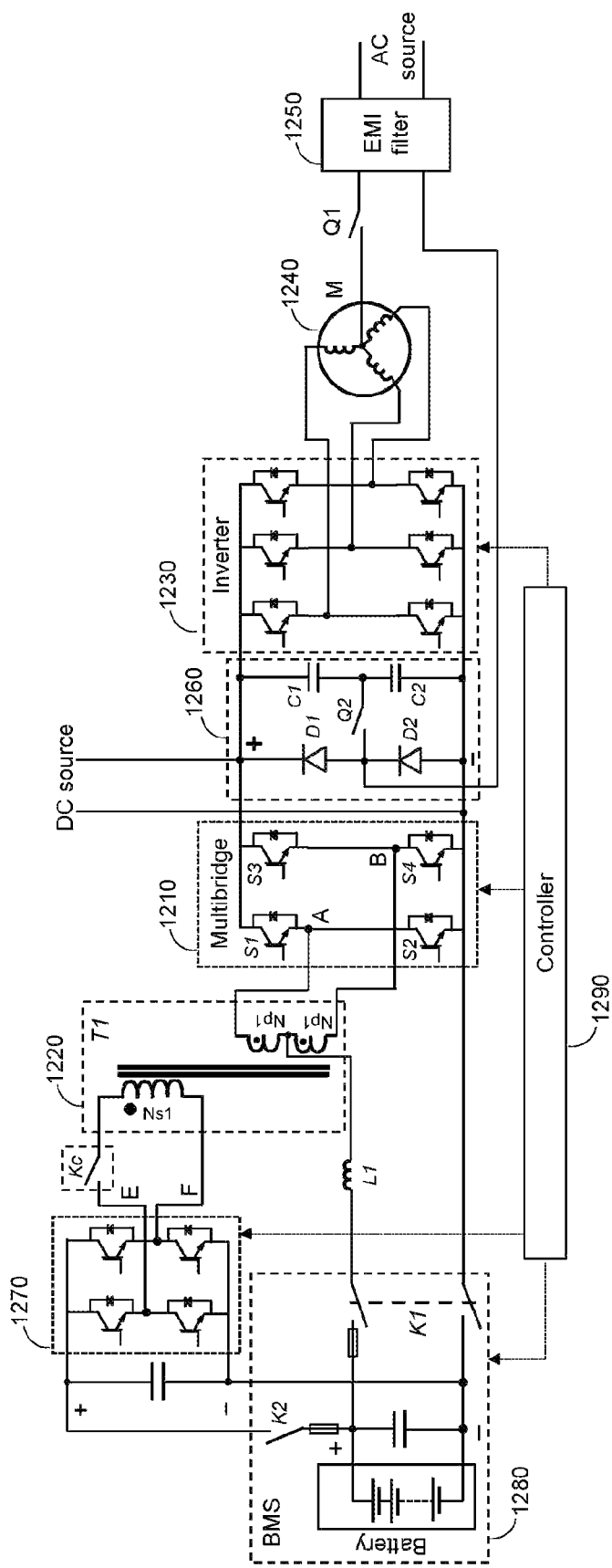
FIG. 12 illustrates another circuit example of multibridge converter-based DC-to-DC boost converter integrated with a battery charging system in accordance with various embodiments of the present disclosure.

FIG. 12 illustrates another example circuit of a multibridge-based DC-DC boost converter and a battery charging system in accordance with various embodiments of the present disclosure. A PWM inverter 1230 is provided for driving an AC traction motor 1240, and the motor winding neutral point is connect to an AC source, with a reference return to DC bus middle point. Here connected across the DC bus is a voltage-doubler circuit 1260, which includes two diodes D1 and D2, and split capacitors C1 and C2 in series with a contactor switch Q2. By the controller 1290 selectively closing the contactor switch Q2, a voltage doubling function may be enabled (i.e. when the switch Q2 is closed, voltage doubling is enabled and when the switch Q2 is open, voltage doubling is disabled). This provides additional flexibility in accommodating a wide range of AC source voltages. The effect of using the voltage doubler 1260 is to provide the same stable high voltage on the DC bus in both low-AC and high-AC input cases. The voltage doubler 1260 should be disabled in the inverter operation. Note both the inverter drive mode and the battery charging mode are featured by the bidirectional power flow capability. Alternatively, a passive rectifier can be used at the output of the secondary winding of the isolation transformer 1220 in place of the active switching rectifier 1270 for cost saving.

Figure 13:
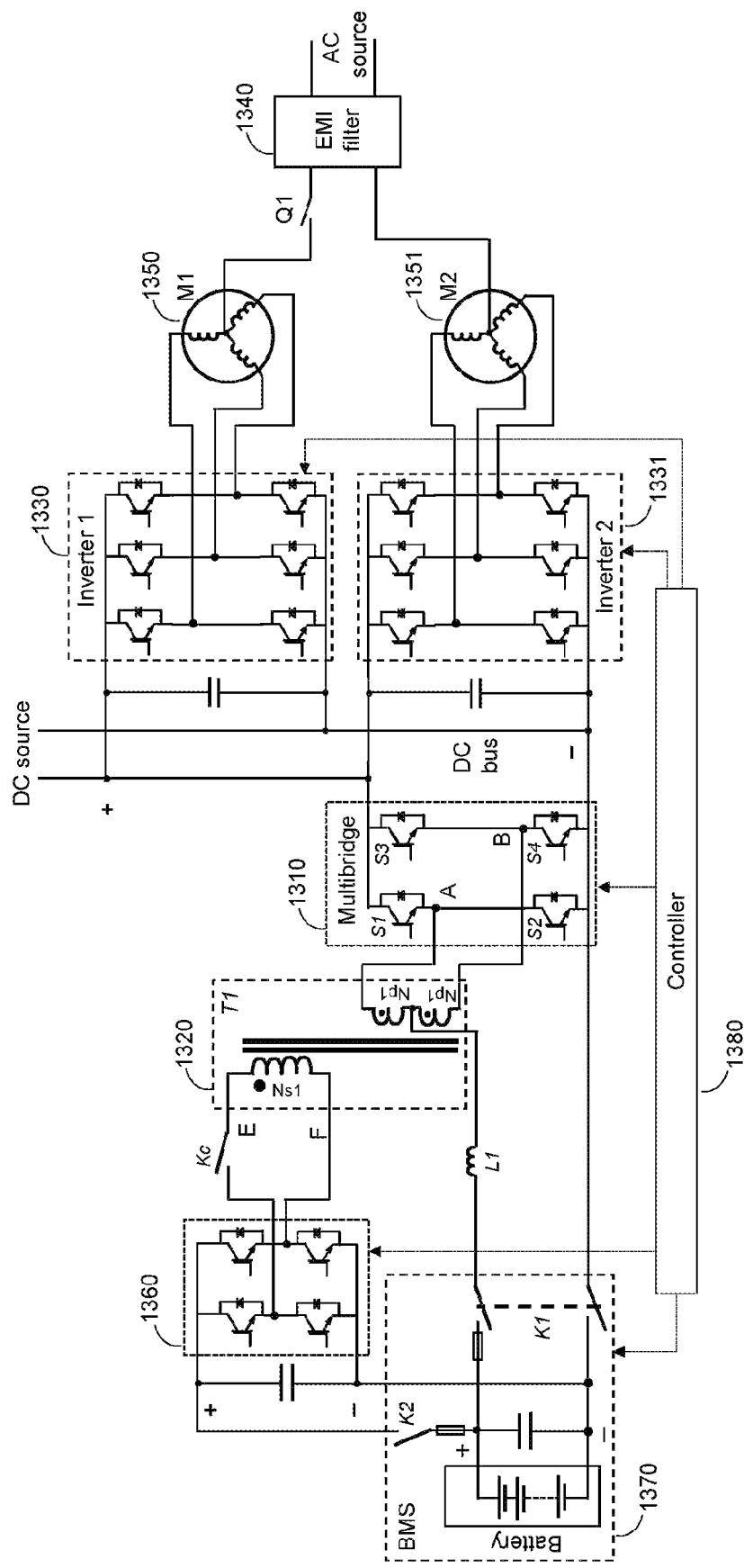
FIG. 13 illustrates another circuit example of multibridge converter-based DC-to-DC boost converter integrated with a battery charging system in accordance with various embodiments of the present disclosure.

FIG. 13 illustrates another example circuit of a multibridge-based DC-DC boost converter and a battery charging system in accordance with various embodiments of the present disclosure. There are two AC traction motors 1350 and 1351 driven by two inverters 1330 and 1331. A single-phase AC source 1340 is connected across the winding neutral points of the two motors 1350 and 1351 and the two inverters 1330 and 1331 are both used for charging with bidirectional power capability. Due to the balanced charging currents among the three-phase motor windings, no significant rotating magnetic force would be generated in the motors 1350 and 1351 and the motor pulsating torque would be negligible. Other than that, the multibridge circuit shown in FIG. 13 basically works in the same way as in FIG. 11.

Figure 14:
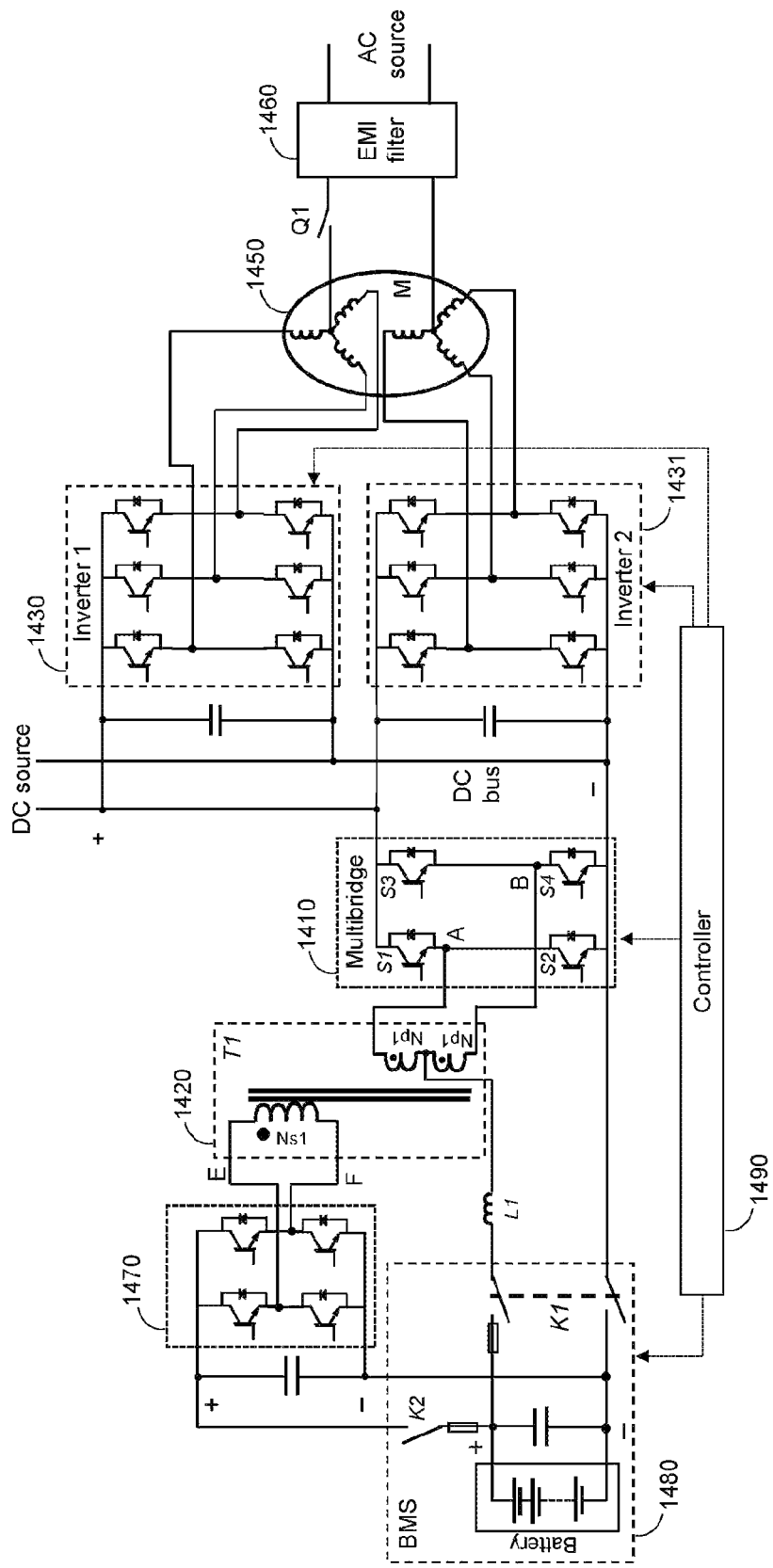
FIG. 14 illustrates another circuit example of multibridge converter-based DC-to-DC boost converter integrated with a battery charging system in accordance with various embodiments of the present disclosure.

FIG. 14 illustrates another embodiment of a multibridge DC-DC boost converter and a transformer-isolated battery charging system. The circuit shown in FIG. 14 is different in that two inverters 1430 and 1431 drive an AC traction motor 1450 with double windings in conventional Y-configuration. A single-phase AC source is connected through an EMI filter 1460 to two neutral points of the double windings of the motor 1450 for charging with bidirectional power capability. Due to the balanced charging currents among each set of the three-phase motor windings, no significant rotating magnetic force would be generated in the motor 1450 and the motor pulsating torque would be negligible. And the circuit works the same way as other circuits previously described.

Figure 15A:
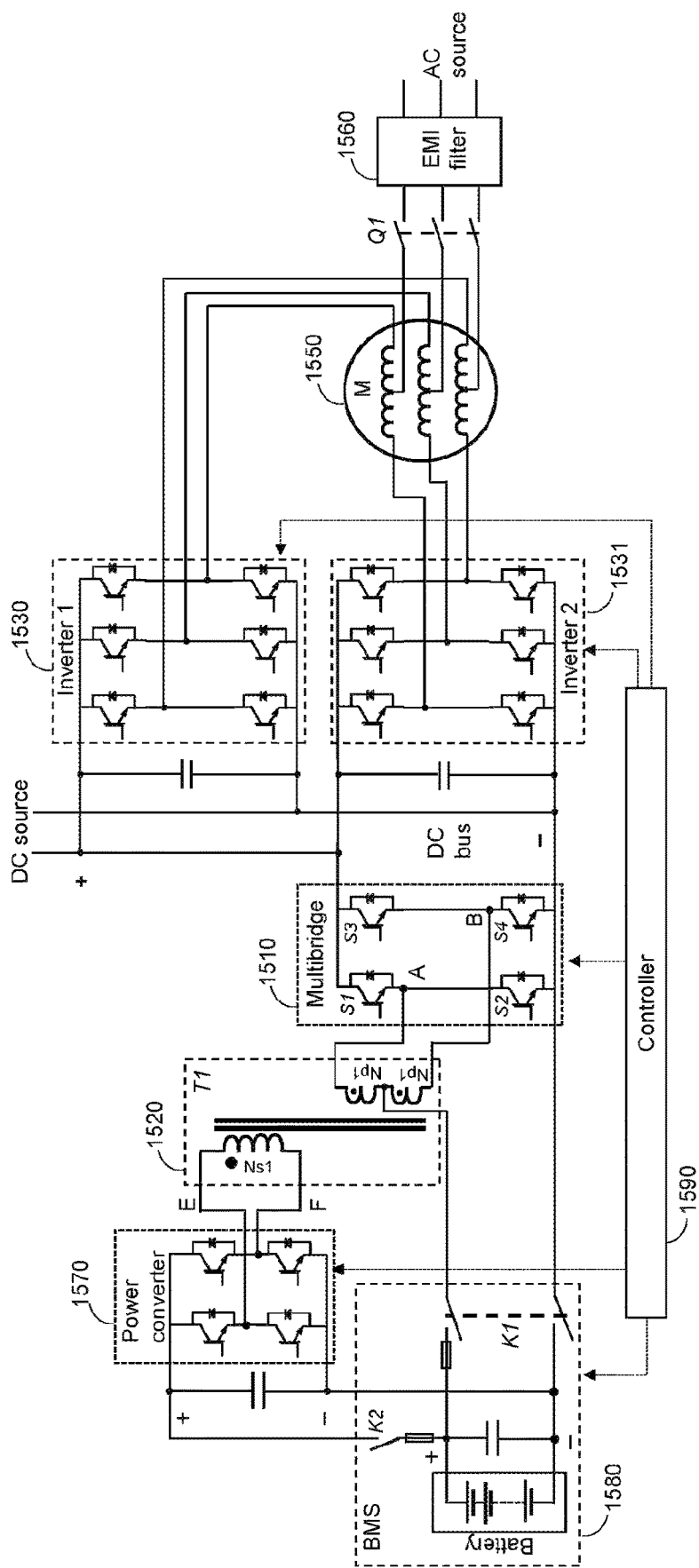
FIG. 15A illustrates another circuit example of multibridge converter-based DC-to-DC boost converter integrated with a battery charging system in accordance with various embodiments of the present disclosure.

FIG. 15A illustrates another example circuit of a multibridge-based DC boost converter and a transformer-isolated battery charging system in accordance with various embodiments of the present disclosure. The circuit shown in FIG. 15A is different in that two inverters 1530 and 1531 drive an AC traction motor 1550 with open winding configuration. A three-phase AC source is connected through an EMI filter 1560 and an AC contact switch Q1 to three middle points of windings of the motor 1550 for charging with bidirectional power capability. During charging of the battery 1580, both inverters 1530 and 1531 operate as Boost PFC rectifiers and draw evenly distributed currents among all three phase winding of the motor 1550. As a result of these balance currents, the motor windings will not generate any significant rotating magnetic force and the motor pulsating torque would be negligible. Other than that, the multibridge circuit in FIG. 15A works the same way as that in FIG. 11.

Figure 15B:
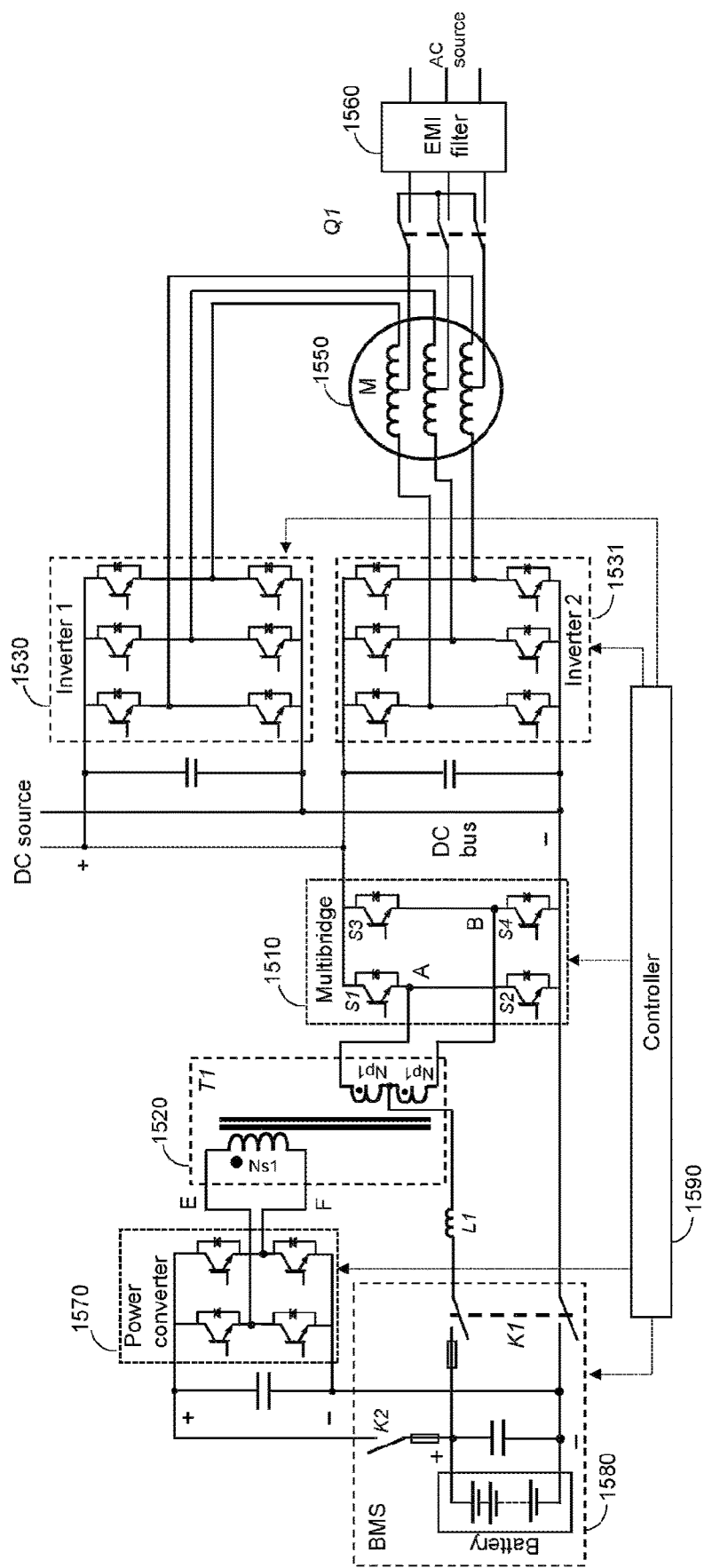
FIG. 15B illustrates another circuit example of multibridge converter-based DC-to-DC boost converter integrated with a battery charging system in accordance with various embodiments of the present disclosure.

FIG. 15B illustrates another embodiment of a multibridge DC boost converter, with a three-phase or split-phase AC input connected to open winding middle points of a motor 1550 for battery charging. The circuit shown in FIG. 15B is different in that the AC contactor switch Q1 is configured with a common neutral point that can change the motor windings into double Y-configurations when enabled. With the common neutral point connected, the double Y-configurations have the flexibility of operating the motor in a 6-phase mode vs. 3-phase double winding mode. The difference is the relative current phase relationship among the motor windings in terms of space vector control. The benefit would be reducing the back EMF voltage reflected across the DC bus at the high motor speed of the motor and increase the motor current capability at lower motor speed.

Figure 15C:
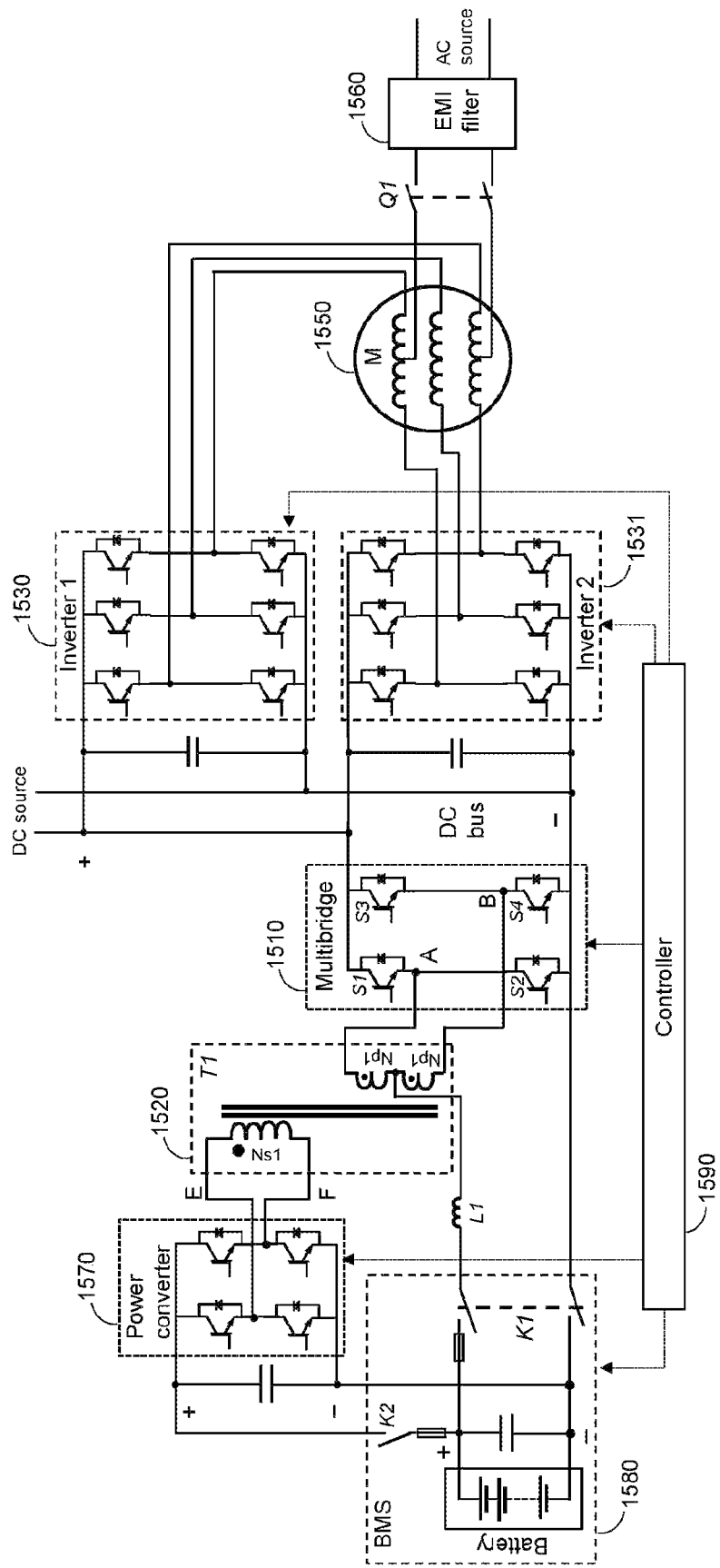
FIG. 15C illustrates another circuit example of multibridge converter-based DC-to-DC boost converter integrated with a battery charging system in accordance with various embodiments of the present disclosure.

FIG. 15C illustrates another embodiment of a multibridge DC-DC boost converter, with a single-phase AC input connected to a three-phase motor 1550 at its open winding middle points for battery charging. Note only two motor windings have the mid points connected to the AC input, which is typical with single-phase AC source. In this case, the motor needs to have a special type and commonly seen dual-section winding motor, where each phase winding basically has two half windings with two layers of conducting wires overlapped in the same slots at the same current direction. With the winding mid points injecting equal current into both half windings the induced magnetic forces are always balanced and cancelled. Therefore, balanced motor winding currents during PFC rectifier operation will not cause any significant pulsating torque or vibration issue.

Aspects of the present technology may be applied to a wide range of electric motors in a variety of arrangements (e.g. multiple motors in an EV). A few examples are illustrated here but it will be understood that these are not limiting and that the present technology is applicable to many more types of electric motors in many more configurations.

Aspects of the present technology are not limited to any single type of electric motor and may be used with different electric motor designs including single winding motors, dual winding motors, and open winding motors and with any number of motors (either of the same type or different types).

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A power converter apparatus comprising:
    a multibridge comprising at least two switching bridges connected to a common DC bus and generating pulse-width-modulated (PWM) voltages to non-isolated outputs; and
    an isolation transformer having a primary winding connected across the non-isolated outputs and having a secondary winding connected to isolated outputs, wherein:
    in a non-isolated mode, the at least two switching bridges are controlled to operate in a parallel mode, and power is transferred between the DC bus and a load coupled to the non-isolated outputs and power bypasses the transformer due to the parallel operation of the at least two switching bridges; and
    in an isolated mode, the at least two switching bridges are controlled to operate in a full-bridge mode, and power is transferred between the DC bus and a load coupled to the isolated outputs through the transformer.

2. The power converter apparatus of claim 1, wherein a controller is configured to operate the at least two switching bridges according to at least two different operation modes:
    in the non-isolated mode, the at least two switching bridges are controlled with PWM switching signals which are synchronized in phase; and
    in the isolated mode, the at least two switching bridges are controlled with PWM switching signals which are phase shifted.

3. The power converter apparatus of claim 1, wherein at least one transformer disconnect switch is connected in series with the isolation transformer winding, either on the primary side or on the secondary side, and operated according to at least two different operation modes:
    in the non-isolated mode, the transformer disconnect switch remains open and the at least two switching bridges are controlled in an interleaved parallel mode wherein, the PWM switching signals are synchronized and interleaved with a phase shift angle, in order to increase the effective PWM switching frequency across the non-isolated outputs; and
    in the isolated mode, the transformer disconnect switch remains closed and the at least two switching bridges are controlled in a full-bridge mode.

4. The power converter apparatus of claim 1, wherein the multibridge uses two-level, three-level, five-level, or any multilevel converter topologies, such as diode neutral-point-clamp (NPC) multilevel converter, active NPC (ANPC) multilevel converter, flying-capacitor multilevel converter, or a combination of any different multilevel topologies among the at least two switching bridges.

5. The power converter apparatus of claim 1, wherein the multibridge includes three, four or any higher number of switching bridges, either connected to multiple separate isolation transformers, or to the same isolation transformer with multiple windings that are coupled together, or to a mixture of different transformer configurations.

6. The power converter apparatus of claim 1, further configured as a non-isolated PWM inverter integrated with an isolated battery charging system, comprising:
    a battery connected to the DC bus through a main contactor or a switch;
    two or more multibridges, each having at least two switching bridges, connected to the DC bus, to form a DC-to-AC inverter and generate PWM voltages to non-isolated outputs; and
    one or more isolation transformers, having primary windings connected across the outputs of the two or more multibridges and having secondary windings connected to power converters of any type to charge the battery, wherein:
    in the non-isolated mode, the battery main contactor remains closed, inverter operation is performed, and power is transferred from the battery to the DC bus through the battery main contactor and power bypasses the isolation transformer; and in the isolated mode, the battery main contactor remains open, battery charging operation is performed, and power is transferred from the DC bus to the battery through the isolation transformer.

7. The power converter apparatus of claim 6, wherein the non-isolated outputs of the two or more multibridges provide power to drive an AC motor with two or more sets of motor windings which are separate from one another; and, during battery charging operation in the isolated mode, additional PWM gate switching synchronization is applied among those switching bridges connected across the same set of motor windings, therefore each set of motor windings are excited with nearly and effectively zero differential voltages across the motor terminals in order to reduce any unintended motor circulating currents.

8. The power converter apparatus of claim 6, wherein during battery charging operation in the isolated mode, the two or more multibridges are used in part or in whole as an AC-to-DC rectifier; and, the switching bridges are operated in reverse power direction to draw power from an AC source to the DC bus.

9. The power converter apparatus of claim 1, further configured as a non-isolated DC Boost converter integrated with an isolated battery charging system, including:
one or more multibridges, each having at least two switching bridges, connected to the DC bus, to form a DC-to-DC Boost converter, with non-isolated outputs connected to a battery through a main contactor switch and one or more inductors; and
one or more isolation transformers, having primary windings connected across the non-isolated outputs of the one or more multibridges and having secondary windings connected to isolated outputs, wherein the isolated outputs are coupled to a power converter to charge the battery; wherein:
in the non-isolated mode, the battery main contactor is closed, DC boost operation is performed, and power is transferred from the battery to the DC bus through the battery main contactor and power bypasses the isolation transformer; and
in the isolated mode, the battery main contactor is open, battery charging operation is performed, and power is transferred from the DC bus to the battery through the isolation transformer.

10. The power converter apparatus of claim 9, further comprising a PWM inverter connected to the DC bus and drives an AC motor, wherein, during battery charging operation in the isolated mode, the PWM inverter is operated in reverse power flow as a AC-to-DC rectifier to draw power from an AC source.

11. A method of designing a power converter, comprising:
forming a multibridge using at least two switching bridges, both connected to a common DC bus and generating pulse-width-modulated (PWM) voltages to non-isolated outputs;
placing a transformer, having a primary winding connected across the non-isolated outputs and having a secondary winding connected to isolated outputs, wherein,
in a non-isolated mode, operating the at least two switching bridges in a parallel mode wherein power is transferred between the DC bus and a load coupled to the non-isolated outputs and power bypasses the transformer due to the parallel operation of the at least two switching bridges; and,
in an isolated mode, operating the at least two switching bridges in a full-bridge mode wherein power is transferred between the DC bus and a load coupled to the isolated outputs through the transformer.

12. The method of claim 11, further comprising designing a controller, operating the at least two switching bridges according to at least two different operation modes:
in the non-isolated mode, operating the at least two switching bridges with PWM switching signals which are synchronized in phase; and,
in the isolated mode, operating the at least two switching bridges with PWM switching signals which are phase-shifted.

13. The method of claim 11, further comprising connecting at least one disconnect switch in series with the isolation transformer winding, either on the primary side or on the secondary side, wherein,
in the non-isolated mode, keeping the transformer disconnect switch open, operating the at least two switching bridges in an interleaved parallel mode, synchronizing the PWM switching signals and interleaving the PWM signals with a phase shift angle, such that the effective PWM switching frequency is increased across the non-isolated outputs; and,
in the isolated mode, keeping the transformer disconnect switch closed, operating the at least two switching bridges in a full-bridge mode, phase-shifting the PWM switching signals to be out of phase.

14. An electric vehicle, comprising:
a multibridge power converter comprising one or more multibridges, each comprising at least two switching bridges, and one or more transformers according to claim 1, connected to the DC bus;
a battery coupled to the isolated outputs of the multibridge power converter, wherein the battery is coupled to the DC bus via a main contactor during the non-isolated mode.

15. The electric vehicle of claim 14, wherein inverter operation is performed in the non-isolation mode, the non-isolated outputs of the multibridge power converter provide power to drive an AC motor with two or more sets of motor windings which are separate from one another; and wherein during battery charging operation in the isolated mode, additional PWM gate switching synchronization is applied among the switching bridges of the multibridge power converter connected across the same set of motor windings, such that each set of the motor windings are excited with nearly and effectively zero differential voltages across the motor terminals in order to reduce any unintended motor circulating currents.

16. An electric vehicle, comprising:
a multibridge power converter comprising at least two switching bridges connected to a common DC bus and generating pulse-width-modulated (PWM) voltages to non-isolated outputs, to form a DC-to-DC Boost converter, with the non-isolated outputs connected to a battery through a main contactor and one or more inductors; and
an isolation transformer, having a primary winding connected across the non-isolated outputs of the at least two switching bridges and having a secondary winding connected to isolated outputs, wherein the isolated outputs are coupled to a power converter to charge the battery wherein:

in a non-isolated mode, the battery main contactor is closed, DC boost operation is performed, and power is transferred between the battery and the DC bus through the main contactor; and in an isolated mode, the battery main contactor is opened, battery charging operation is performed, and power is transferred between the DC bus and the battery through the isolation transformer.

17. The electric vehicle of claim 16, wherein a controller is configured to operate the at least two switching bridges according to at least two different operation modes:

in the non-isolated mode, the at least two switching bridges are controlled to operate in a parallel mode, wherein the PWM switching signals are synchronized in phase; and in the isolated mode, the at least two switching bridges are controlled to operate in a full-bridge mode, wherein the PWM switching signals are phase shifted.

18. The electric vehicle of claim 16, wherein at least one disconnect switch is connected in series with the isolation transformer winding, either on the primary side or on the secondary side, and operated according to at least two different operation modes:

in the non-isolated mode, the transformer disconnect switch remains open and the at least two switching bridges are controlled in an interleaved parallel mode wherein, the PWM switching signals are synchronized and interleaved with a phase shift angle to increase the effective PWM switching frequency across the non-isolated outputs; and in the isolated mode, the transformer disconnect switch remains closed and the at least two switching bridges are controlled in a full-bridge mode, wherein the PWM switching signals are phase shifted.

19. The electric vehicle of claim 16, wherein the inductors are integrated in part or in whole into the isolation transformer design, and wherein the battery is connected through the main contactor to the middle point of the isolation transformer primary windings.

20. The electric vehicle of claim 16, wherein the multibridge power converter uses two-level, three-level, five-level, or any multilevel converter topologies, such as diode neutral-point-clamp (NPC) multilevel converter, active NPC (ANPC) multilevel converter, flying-capacitor multilevel converter, or a combination of any different multilevel topologies among the at least two switching bridges;

wherein the multibridge power converter includes three, four or any higher number of switching bridges, either connected to multiple separate isolation transformers, or to the same isolation transformer with multiple windings that are coupled together, or to a mixture of different transformer configurations.

\* \* \* \* \*